US009628500B1

(12) United States Patent
Kesin et al.

(10) Patent No.: US 9,628,500 B1
(45) Date of Patent: Apr. 18, 2017

(54) NETWORK ANOMALY DETECTION

(71) Applicant: Palantir Technologies Inc., Palo Alto, CA (US)

(72) Inventors: Maxim Kesin, Woodmere, NY (US); Samuel Jones, New York City, NY (US)

(73) Assignee: Palantir Technologies Inc., Palo Alto, CA (US)

( * ) Notice: Subject to any disclaimer, the term of this patent is extended or adjusted under 35 U.S.C. 154(b) by 0 days.

(21) Appl. No.: 15/224,443

(22) Filed: Jul. 29, 2016

Related U.S. Application Data

(63) Continuation of application No. 14/970,317, filed on Dec. 15, 2015, now Pat. No. 9,407,652.

(60) Provisional application No. 62/207,297, filed on Aug. 19, 2015, provisional application No. 62/185,453, filed on Jun. 26, 2015.

(51) Int. Cl.
*H04L 29/06* (2006.01)
*G06N 7/00* (2006.01)

(52) U.S. Cl.
CPC ......... *H04L 63/1425* (2013.01); *G06N 7/005* (2013.01)

(58) Field of Classification Search
CPC ............................ H04L 63/1425; G06N 7/005
See application file for complete search history.

(56) References Cited

U.S. PATENT DOCUMENTS

| | | | |
|---|---|---|---|
| 5,978,475 A | 11/1999 | Schneier et al. | |
| 6,253,203 B1 | 6/2001 | O'Flaherty et al. | |
| 6,725,240 B1 | 4/2004 | Asad et al. | |
| 6,807,569 B1 | 10/2004 | Bhimani et al. | |
| 7,017,046 B2 | 3/2006 | Doyle et al. | |
| 7,069,586 B1 | 6/2006 | Winneg et al. | |
| 7,225,468 B2 | 5/2007 | Waisman et al. | |
| 7,287,689 B2 * | 10/2007 | Tidwell | G06Q 20/042 235/379 |
| 7,596,285 B2 | 9/2009 | Brown et al. | |
| 7,770,032 B2 | 8/2010 | Nesta et al. | |
| 7,801,871 B2 | 9/2010 | Gosnell | |

(Continued)

FOREIGN PATENT DOCUMENTS

| | | |
|---|---|---|
| CN | 101729531 | 6/2010 |
| CN | 103281301 | 9/2013 |

(Continued)

OTHER PUBLICATIONS

Baker et al., "The Development of a Common Enumeration of Vulnerabilities and Exposures," Presented at the Second International Workshop on Recent Advances in Intrusion Detection, Sep. 7-9, 1999, pp. 35.

(Continued)

*Primary Examiner* — Ellen Tran
(74) *Attorney, Agent, or Firm* — Knobbe, Martens, Olson & Bear LLP

(57) ABSTRACT

A security system detects anomalous activity in a network. The system logs user activity, which can include ports used, compares users to find similar users, sorts similar users into cohorts, and compares new user activity to logged behavior of the cohort. The comparison can include a divergence calculation. Origins of user activity can also be used to determine anomalous network activity. The hostname, username, IP address, and timestamp can be used to calculate aggregate scores and convoluted scores.

20 Claims, 18 Drawing Sheets

(56) References Cited

U.S. PATENT DOCUMENTS

| | | | |
|---|---|---|---|
| 7,962,495 B2 | 6/2011 | Jain et al. | |
| 8,181,253 B1 | 5/2012 | Zaitsev et al. | |
| 8,190,893 B2 | 5/2012 | Benson et al. | |
| 8,196,184 B2 | 6/2012 | Amirov et al. | |
| 8,239,668 B1 | 8/2012 | Chen et al. | |
| 8,295,898 B2* | 10/2012 | Ashfield | G06Q 20/3224 455/456.1 |
| 8,301,904 B1 | 10/2012 | Gryaznov | |
| 8,312,546 B2 | 11/2012 | Alme | |
| 8,321,958 B1 | 11/2012 | Fleming et al. | |
| 8,646,080 B2 | 2/2014 | Williamson et al. | |
| 8,683,322 B1 | 3/2014 | Cooper | |
| 8,726,379 B1 | 5/2014 | Stiansen et al. | |
| 8,769,412 B2 | 7/2014 | Gill et al. | |
| 8,782,794 B2 | 7/2014 | Ramcharran | |
| 8,931,043 B2 | 1/2015 | Cooper et al. | |
| 9,009,827 B1 | 4/2015 | Albertson et al. | |
| 9,021,260 B1 | 4/2015 | Falk et al. | |
| 9,049,117 B1 | 6/2015 | Nucci et al. | |
| 9,100,428 B1 | 8/2015 | Visbal | |
| 9,319,419 B2* | 4/2016 | Sprague | H04L 63/126 |
| 9,335,897 B2 | 5/2016 | Goldenberg | |
| 9,338,013 B2 | 5/2016 | Castellucci et al. | |
| 2002/0112157 A1 | 8/2002 | Doyle et al. | |
| 2004/0123139 A1 | 6/2004 | Aiello et al. | |
| 2004/0153418 A1 | 8/2004 | Hanweck | |
| 2004/0250124 A1 | 12/2004 | Chesla et al. | |
| 2005/0125295 A1* | 6/2005 | Tidwell | G06Q 20/042 705/16 |
| 2005/0157662 A1 | 7/2005 | Bingham et al. | |
| 2005/0229256 A2 | 10/2005 | Banzhof | |
| 2005/0262556 A1 | 11/2005 | Waisman et al. | |
| 2005/0275638 A1 | 12/2005 | Kolmykov-Zotov et al. | |
| 2006/0031928 A1 | 2/2006 | Conley et al. | |
| 2006/0069912 A1 | 3/2006 | Zheng et al. | |
| 2006/0179003 A1 | 8/2006 | Steele et al. | |
| 2006/0212931 A1 | 9/2006 | Shull et al. | |
| 2006/0218637 A1 | 9/2006 | Thomas et al. | |
| 2006/0265747 A1 | 11/2006 | Judge | |
| 2007/0143851 A1 | 6/2007 | Nicodemus et al. | |
| 2007/0294766 A1 | 12/2007 | Mir et al. | |
| 2008/0104407 A1 | 5/2008 | Horne et al. | |
| 2008/0201580 A1 | 8/2008 | Savitzky et al. | |
| 2008/0222706 A1 | 9/2008 | Renaud et al. | |
| 2008/0229422 A1 | 9/2008 | Hudis et al. | |
| 2009/0103442 A1 | 4/2009 | Douville | |
| 2009/0228701 A1 | 9/2009 | Lin | |
| 2009/0328222 A1 | 12/2009 | Helman et al. | |
| 2010/0024017 A1* | 1/2010 | Ashfield | G06F 21/35 726/7 |
| 2010/0077481 A1 | 3/2010 | Polyakov et al. | |
| 2010/0100963 A1 | 4/2010 | Mahaffey | |
| 2010/0179831 A1 | 7/2010 | Brown et al. | |
| 2010/0235915 A1 | 9/2010 | Memon et al. | |
| 2010/0262688 A1 | 10/2010 | Hussain et al. | |
| 2010/0330801 A1 | 12/2010 | Rouh | |
| 2011/0060910 A1 | 3/2011 | Gormish et al. | |
| 2011/0202555 A1 | 8/2011 | Cordover et al. | |
| 2011/0219450 A1 | 9/2011 | McDougal et al. | |
| 2012/0079592 A1 | 3/2012 | Pandrangi | |
| 2012/0084866 A1 | 4/2012 | Stolfo | |
| 2012/0110633 A1 | 5/2012 | An et al. | |
| 2012/0110674 A1 | 5/2012 | Belani et al. | |
| 2012/0169593 A1 | 7/2012 | Mak et al. | |
| 2012/0218305 A1 | 8/2012 | Patterson et al. | |
| 2012/0254129 A1 | 10/2012 | Wheeler et al. | |
| 2012/0266245 A1 | 10/2012 | McDougal et al. | |
| 2012/0284791 A1 | 11/2012 | Miller et al. | |
| 2012/0304244 A1 | 11/2012 | Xie et al. | |
| 2012/0323829 A1 | 12/2012 | Stokes et al. | |
| 2012/0330801 A1 | 12/2012 | McDougal et al. | |
| 2013/0019306 A1 | 1/2013 | Lagar-Cavilla et al. | |
| 2013/0097709 A1 | 4/2013 | Basavapatna et al. | |
| 2013/0110876 A1 | 5/2013 | Meijer et al. | |
| 2013/0139268 A1 | 5/2013 | An et al. | |
| 2013/0239217 A1 | 9/2013 | Kindler et al. | |
| 2014/0013451 A1 | 1/2014 | Kulka et al. | |
| 2014/0059683 A1 | 2/2014 | Ashley | |
| 2014/0123279 A1 | 5/2014 | Bishop et al. | |
| 2014/0143009 A1 | 5/2014 | Brice et al. | |
| 2014/0173712 A1 | 6/2014 | Ferdinand | |
| 2014/0173738 A1 | 6/2014 | Condry et al. | |
| 2014/0188895 A1 | 7/2014 | Wang et al. | |
| 2014/0229422 A1 | 8/2014 | Jain et al. | |
| 2014/0283107 A1 | 9/2014 | Walton et al. | |
| 2014/0366132 A1 | 12/2014 | Stiansen et al. | |
| 2015/0039565 A1 | 2/2015 | Lucas | |
| 2015/0089568 A1* | 3/2015 | Sprague | H04L 63/0876 726/1 |
| 2015/0128274 A1 | 5/2015 | Giokas | |
| 2015/0188715 A1 | 7/2015 | Castellucci et al. | |
| 2015/0229664 A1 | 8/2015 | Hawthorn et al. | |
| 2015/0248563 A1 | 9/2015 | Alfarano et al. | |
| 2015/0261847 A1 | 9/2015 | Ducott et al. | |
| 2015/0326601 A1 | 11/2015 | Grondin et al. | |
| 2016/0004864 A1 | 1/2016 | Falk et al. | |
| 2016/0028759 A1 | 1/2016 | Visbal | |
| 2016/0050224 A1 | 2/2016 | Ricafort et al. | |

FOREIGN PATENT DOCUMENTS

| | | |
|---|---|---|
| EP | 1962222 | 8/2008 |
| EP | 2892197 | 7/2015 |
| EP | 2897051 | 7/2015 |
| EP | 2963578 | 1/2016 |
| EP | 2985974 | 2/2016 |
| NL | 2011642 | 8/2015 |
| WO | WO 2005/010685 | 2/2005 |

OTHER PUBLICATIONS

Bhuyan et al., "Network Anomaly Detection: Methods, Systems and Tools," First Quarter 2014, IEEE.

Crosby et al., "Efficient Data Structures for Tamper-Evident Logging," Department of Computer Science, Rice University, 2009, pp. 17.

FireEye—Products and Solutions Overview, http://www.fireeye.com/products-and-solutions Printed Jun. 30, 2014 in 3 pages.

FireEye, http://www.fireeye.com/ Printed Jun. 30, 2014 in 2 pages.

Glaab et al., "EnrichNet: Network-Based Gene Set Enrichment Analysis," Bioinformatics 28.18 (2012): pp. i451-i457.

Huang et al., "Systematic and Integrative Analysis of Large Gene Lists Using DAVID Bioinformatics Resources", Nature Protocols, 2009, vol. 4, No. 1, pp. 44-57.

Hur et al., "SciMiner: web-based literature mining tool for target identification and functional enrichment analysis," Bioinformatics 25.6 (2009): pp. 838-840.

Lee et al., "A Data Mining and CIDF Based Approach for Detecting Novel and Distributed Intrusions," Lecture Notes in Computer Science, vol. 1907, Nov. 11, 2000, pp. 49-65.

Ma et al., "A New Approach to Secure Logging," ACM Transactions on Storage, Published Mar. 2009, vol. 5, No. 1, Article 2, pp. 20.

Schneier et al., "Automatic Event Stream Notarization Using Digital Signatures," Security Protocols, International Workshop Apr. 1996 Proceedings, Springer-Veriag, 1997, pp. 155-169, https://schneier.com/paper-event-stream.pdf.

Schneier et al., "Cryptographic Support for Secure Logs on Untrusted Machines," The Seventh USENIX Security Symposium Proceedings, USENIX Press, Jan. 1998, pp. 53-62, https://www.schneier.com/paper-secure-logs.pdf.

VirusTotal—About, http://www.virustotal.com/en/about/ Printed Jun. 30, 2014 in 8 pages.

Waters et al., "Building an Encrypted and Searchable Audit Log," Published Jan. 9, 2004, 11 pages, http://www.parc.com/content/attachments/building_encrypted_searchable_5059_parc.pdf.

Zheng et al., "GOEAST: a web-based software toolkit for Gene Ontology enrichment analysis," Nucleic acids research 36.suppl2 (2008): pp. W385-W363.

(56) References Cited

OTHER PUBLICATIONS

Notice of Allowance for U.S. Appl. No. 14/033,076 dated Mar. 11, 2016.
Notice of Allowance for U.S. Appl. No. 14/223,918 dated Jan. 6, 2016.
Notice of Allowance for U.S. Appl. No. 14/280,490 dated Nov. 26, 2014.
Notice of Allowance for U.S. Appl. No. 14/473,860 dated Feb. 27, 2015.
Notice of Allowance for U.S. Appl. No. 14/473,860 dated Jan. 5, 2015.
Notice of Allowance for U.S. Appl. No. 14/479,863 dated Mar. 31, 2015.
Notice of Allowance for U.S. Appl. No. 14/823,935 dated Apr. 25, 2016.
Notice of Allowance for U.S. Appl. No. 14/970,317 dated May 26, 2016.
Official Communication for European Patent Application No. 14199180.2 dated Jun. 22, 2015.
Official Communication for European Patent Application No. 14199180.2 dated Aug. 31, 2015.
Official Communication for European Patent Application No. 15175106.2 dated Nov. 5, 2015.
Official Communication for European Patent Application No. 15180985.2 dated Jan. 15, 2016.
Official Communication for U.S. Appl. No. 14/033,076 dated Aug. 13, 2015.
Official Communication for U.S. Appl. No. 14/033,076 dated Nov. 6, 2015.
Official Communication for U.S. Appl. No. 14/223,918 dated Jun. 8, 2015.
Official Communication for U.S. Appl. No. 14/280,490 dated Jul. 24, 2014.
Official Communication for U.S. Appl. No. 14/473,860 dated Nov. 4, 2014.
Official Communication for U.S. Appl. No. 14/479,863 dated Dec. 26, 2014.
Official Communication for U.S. Appl. No. 14/490,612 dated Aug. 18, 2015.
Official Communication for U.S. Appl. No. 14/490,612 dated Jan. 27, 2015.
Official Communication for U.S. Appl. No. 14/490,612 dated Mar. 31, 2015.
Official Communication for U.S. Appl. No. 14/731,312 dated Apr. 14, 2016.
Official Communication for U.S. Appl. No. 14/816,748 dated Apr. 1, 2016.
Official Communication for U.S. Appl. No. 14/816,748 dated May 24, 2016.
Official Communication for U.S. Appl. No. 14/823,935 dated Dec. 4, 2015.
Official Communication for U.S. Appl. No. 14/923,712 dated Feb. 12, 2016.
Official Communication for U.S. Appl. No. 14/923,712 dated Jun. 17, 2016.
Official Communication for U.S. Appl. No. 14/970,317 dated Mar. 21, 2016.
Official Communication for U.S. Appl. No. 14/982,699 dated Mar. 25, 2016.
Official Communication for U.S. Appl. No. 15/071,064 dated Jun. 16, 2016.
Official Communication for European Patent Application No. 16176273.7 dated Oct. 21, 2016.

* cited by examiner

NETWORK ANOMALY DETECTION

RELATED APPLICATIONS

The present disclosure references various features of and claims priority to U.S. patent application Ser. No. 14/970, 317, filed Dec. 15, 2015, which application claims priority to U.S. Provisional Pat. App. No. 62/185,453, filed Jun. 26, 2015, and U.S. Provisional Pat. App. No. 62/207,297, filed Aug. 19, 2015. The entire disclosure of those applications are hereby made part of this specification as if set forth fully herein and incorporated by reference for all purposes, for all that it contains.

TECHNICAL FIELD

The present disclosure relates to systems, methods, and techniques for computer and network security, and more specifically to improving the security of computer systems and networks, and even more specifically to detecting anomalous behavior indicative of hacking.

BACKGROUND

Computer systems and networks can employ various measures to prevent activity by unauthorized users. For example, a network can require a username and password to authenticate a user before allowing access. However, there remains a need for a security system to better detect anomalous activity, for example, when an authenticated user is actually a malicious actor, and furthermore, there remains a need to implement such a security system in a dynamic manner that reduces the need for manual configuration with more accurate results.

SUMMARY

The systems, methods, and devices described herein each have several aspects, no single one of which is solely responsible for its desirable attributes. Without limiting the scope of this disclosure, several non-limiting features will now be discussed briefly.

An anomaly-detection computer system is disclosed herein to identify when a user of a network is a malicious actor. The system can include one or more computer readable storage devices configured to store one or more software modules including computer executable instructions, and one or more hardware computer processors in communication with the one or more computer readable storage devices. The instructions are executed on the one or more software modules to cause the computer system to: log, to the one or more computer readable storage devices, activity on the network by a plurality of users; calculate similarity scores based at least in part on the logged activity on the network; sort the plurality of users into a plurality of cohorts based at least in part on the similarity scores; store data about the plurality of cohorts into a memory; detect a first port used in a new network activity of a first user of the plurality of users sorted into a first cohort of the plurality of cohorts; determine, based at least in part on a comparison performed by the one or more processors of the first port to other ports used by the first cohort, that the new network activity by the first user is anomalous; and restrict, based at least in part on determining that the new network activity by the first user is anomalous, an ability of the first user to access a network resource.

The anomaly-detection computer system of the preceding paragraph can have any sub-combination of the following features: the network resource is a distributed resource that is accessible through a plurality of different network IP addresses; calculating the similarity scores can include a determination of at least one of a cosine similarity score and a Jaccard similarity score; calculating the similarity scores can include performing an inverse user frequency transform; determining if the network activity by the first user is anomalous by determining the first port has been used by other members of the first cohort; performing a Kullback-Leibler divergence; receiving user information about the plurality of users; sorting the plurality of users into a plurality of cohorts based at least in part on the similarity scores and the user information; new network activity is authenticated by the credentials of the first user; the first port is a port of a computer of the first user; the first port comprises at least one of a port of a server hosting the network resource and a port of a second server hosting the network resource; and the network is a virtual private network.

Another aspect of the disclosure is directed to a computer readable, non-transitory storage medium having a computer program stored thereon executable by one or more processors of an anomaly detection system in a network. When the computer program of the non-transitory storage medium is executed, a computer system can: log resource access by a plurality of users during a first time period; calculate a plurality of similarity scores for the plurality of users, the plurality of similarity scores comprising a first similarity score between a first user of the plurality of users and a second user of the plurality of users; assign, based at least in part on the first similarity score, the first user and the second user to a first cohort; log a first plurality of resource accesses by the first user during a second time period that is at least partially different from the first time period; log a second plurality of resource accesses by members of the first cohort; determine a probability score of the first plurality of resource accesses; and generate, based at least on the divergence, an indicator of a potential anomaly.

The computer readable, non-transitory storage medium having a computer program stored thereon can further be executed to have any sub-combination of the following features: the probability score is a Kullback-Leibler divergence of the first plurality of resource accesses to the second plurality of resource accesses; the probability score is a Kullback-Leibler divergence of the second plurality of resource accesses to the first plurality of resource accesses; and the first plurality of resources accesses contains a first distribution of access to a set of resources, and wherein the second plurality of resource accesses contains a second distribution of accesses to the set of resources.

Another aspect of the disclosure is directed to a computer-implemented method for detecting an anomalous activity in a network. The method, as implemented by one or more computer readable storage devices configured to store one or more software modules including computer executable instructions, and by one or more hardware computer processors in communication with the one or more computer readable storage devices configured to execute the one or more software modules, comprises: logging, to the one or more computer readable storage devices, user activity for a plurality of users in the network; sorting the plurality of users into a plurality of cohorts; detecting a new activity by a first user of the first plurality of users sorted into a first cohort of the plurality of cohorts; determining a origin of the new activity; determining the probability that the new activity is an attack based, at least in part, on the origin of the new activity; and generating, based at least in part on the probability that the new activity is an attack, an indicator of a potential anomaly.

The computer-implemented method of the preceding paragraph can have any sub-combination of the following features: determining a distribution of ordinary network activity, where determining the probability that the new activity is an attacked is further based, at least in part, on the distribution of ordinary network activity; determining the probability that the new activity is an attacked is further based, at least in part, on attack origin distribution data; receiving the attack origin distribution data for a plurality of countries, and interpolating attack origin distribution data for a country not in the plurality of countries; comparing the new user activity to logged activity of the first user to generate a second comparison result, and comparing the new user activity to logged activity the first cohort to generate a second comparison result, where generating the indicator of the potential anomaly is further based, at least in part, on the second comparison result and the third comparison result.

BRIEF DESCRIPTION OF THE DRAWINGS

The following drawings and the associated descriptions are provided to illustrate embodiments of the present disclosure and do not limit the scope of the claims. Aspects and many of the attendant advantages of this disclosure will become more readily appreciated as the same become better understood by reference to the following detailed description, when taken in conjunction with the accompanying drawings, wherein:

Figure 1:
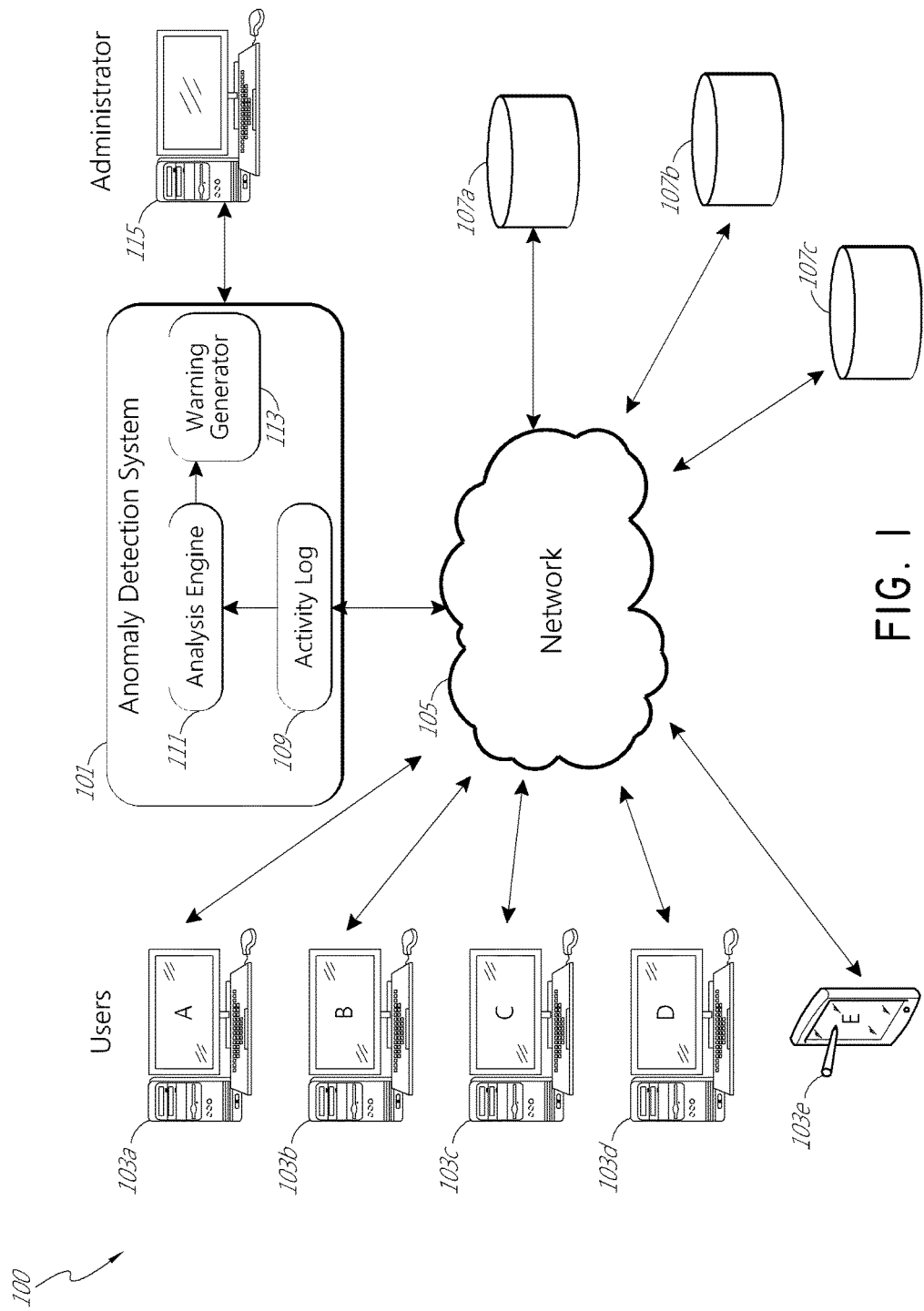
FIG. 1 shows an example of a computer network using an anomaly detection system according to one embodiment.

Throughout the drawings, reference numbers may be reused to indicate correspondence between referenced elements. Nevertheless, use of different numbers does not necessarily indicate a lack of correspondence between elements. And, conversely, reuse of a number does not necessarily indicate that the elements are the same.

DETAILED DESCRIPTION

Definitions

In order to facilitate an understanding of the systems and methods discussed herein, a number of terms are defined below. The terms defined below, as well as other terms used herein, should be construed to include the provided definitions, the ordinary and customary meaning of the terms, and/or any other implied meaning for the respective terms. Thus, the definitions below do not limit the meaning of these terms, but only provide exemplary definitions.

"Anomalous activity" includes, without limitation, actions performed on a network that are not characteristic of actions performed by an authorized user, and the anomalous activity indicates that a different individual has gained access to the network.

"Cohort" includes, without limitation, a group of network users who perform similar activities on a network, at least more similar when compared to activities performed by members of a different group.

"Port" includes, without limitation, a software created communication number in a computer that can be used to by different software to share a physical communication connection.

"Network resources" include, without limitation, resources available through a network. Examples of resources include, without limitation, an email, a database, a file, a program, a server, a computer, a directory, a file path or directory, a permission, a program, a program license, memory, processors, a machine, time to utilize a machine, etc.

"Distributed resources" include, without limitation, resources accessible from different points on a network, such as two separate servers. A resource can be distributed, for example, by being mirrored or striped across different machines, or if a plurality of the resource exists across different network points, such as a software license available on a first server and the same software license available on a different server.

"Network activity" includes, without limitation, all actions performed on a network, such as commands, receptions, traffic, etc. Logging network activity can include, for example, any aspect or combinations of aspects of the network activity, for example, sources, destinations, traffic size, traffic speed, traffic type, data, user ID, user IP address, bandwidth, a total amount of data transmitted by users, a total amount of data received by users, a port used by a user to access the network, a port used by network resources to communicate with the user, an IP address of network resources accessed by the user, times of activity, an origin from which the user accesses the network, a permission level necessary to perform user requests, etc.

"Score" includes, without limitation, numeric rankings, ratings, or grades and can be represented as a number in a range (e.g., 0.0 to 1.0, 0 to 100, −100 to 100), letter (e.g., A+, B, F), label (e.g., safe, neutral, danger), etc. A score can be determined by an algorithm or formula.

Technological Improvements

Various embodiments of the present disclosure provide improvements to various technologies and technological fields. For example, various aspects of the embodiments can improve anomaly detection in a network. Anomalies can be detected even after a user is authenticated, for example, by a username and password. Fewer false positives can be generated. More anomalies can be detected. Anomalies can be detected more accurately. The security system can better determine what is normal for a user to more accurately detect anomalous activity. The security system can detect anomalous behavior because it has not been performed by any member of a cohort. The security system can detect anomalous behavior even if it was previously performed by members of a cohort. The security system can dynamically sort users into cohorts. The security system can dynamically log user activity to adjust data used in detecting anomalies. The security system can dynamically determine anomalous behavior and adjust the determination over time. The security system can require less manual configuration. Not necessarily all such advantages can be achieved in accordance with any particular embodiment of the invention. Thus, the invention can be embodied or carried out in a manner that achieves or optimizes one advantage or group of advantages as taught herein without necessarily achieving other advantages as can be taught or suggested herein.

Various embodiments of the present disclosure discuss recently arisen technological problems and solutions inextricably tied to those technologies. For example, some parts of the specification disclose technology that reduces the number of false positive warnings generated by security systems as a result of distributed resources in a network, a recently arisen technological problem. As another example, parts of the specification disclose an anomaly detection system's use of ports to detect anomalies. Such a usage of ports is not possible in a system without port technology, and therefore is inextricably tied to at least specialized systems featuring port technology.

Parts of the specification disclose how to implement specific technological solutions that are otherwise difficult to implement on a computer. Some parts of the specification discuss computer-implementable solutions to non-mathematical problems such as determining "Is this activity suspicious?"

Parts of the specification disclose improvements to existing technological solutions. For example, some embodiments implement anomaly detection systems that require less setup time or less manual input than prior solutions. As another example, some embodiments feature improved anomaly detection accuracy over previous solutions.

Parts of the specification disclose the use of computer systems to solve problems that cannot be inherently solved by humans alone. For example, computers can perform some functions very quickly to provide security measures that can prevent hacking and data theft. Computers can receive inputs and detect anomalies as fast as or nearly as fast as they occur, and computers can then perform security measures (e.g., disable network access or generate warnings) before the network is compromised. Computer network systems can process data at speeds far faster than humans. By the time humans finish certain computations by hand and discover an anomaly, hackers could have long ago compromised the network, and it would be too late to take any preventative security measures. As a result, a human performing some calculations instead of computers would render useless the anomaly detection system for a computer network. Accordingly, some parts of disclosed methods are performed in real-time or fast enough to prevent further hacking.

Initial Discussion

FIG. 1 shows an example of a computer network 100 using an anomaly detection system according to one embodiment. A plurality of users 103[a-e] can access a network 105. Resources 107a, 107b, and 107c can be connected to and accessible through the network. An anomaly detection system 101 connected to the network includes an activity log 109, analysis engine 111, and warning generator 113. A warning is one example of a type of indicator that can be generated. The anomaly detection system is configured to warn an administrator 115 of anomalous user activity.

The users 103[a-e] can access the network 105 through a variety of different terminals. For example, user 103a can access the network 105 through a desktop computer. User 103e can access the network 105 through a handheld portable device. In some embodiments, users can access the network through desktops, laptops, tablets, smartphones, or other suitable devices.

The users 103[a-e] can access the network to perform similar or different tasks. In order to connect to the network 105, the users can be required to identify themselves, for example, with a username or other identification such has MAC address, IP address, key card, etc. To prevent unauthorized access to the network, the users 103[a-e] can need to authenticate their identity by a password or other type of security token.

The network 105 can be any type of network. For example, it can be a virtual private network (VPN), the internet, an intranet, an internal network, corporate network, local area network (LAN), wireless network, etc.

The resources 107a, 107b, and 107c accessible to a user through the network can include, for example: an email, a database, a file, a program, a server, a computer, a directory, a file path or directory, a permission, a program, a program license, memory, processors, a machine, time to utilize a machine, etc. The resources can be distributed, and the physical machines through which the resources are accessible can be located in different places.

While a username and password provide basic network security to prevent unauthorized access by some individuals, there remains a need for a security system to detect network intrusions after this front line of defense has been breached. For example, a username and password might be stolen by a hacker through phishing, social engineering, keyloggers, etc. In another example, a username and password can be guessed, discovered through a brute-force attack, or reset by an impersonator. As yet another example, a virus, Trojan, or other computer exploit can allow a hacker to infect a user's machine, enabling the hacker to gain access to the network once the user logs into the network from the infected machine. After gaining access, a hacker might attempt to steal sensitive information. This can include, for example, credit card information, personal user information, sales data, business strategies, engineering data, health information, customer lists, pricing records, etc.

As an additional security measure, a network can use an anomaly detection system 101 to detect when an authorized user begins to perform suspicious or anomalous activities that might indicate an unauthorized network access. This anomaly detection system can supplement the username and password security system. However, to detect when anomalous activity occurs, the anomaly detection needs to be able to differentiate between normal and anomalous behaviors. The anomaly detection system 101 logs user activity in an activity log 109. The anomaly detection system can obtain this information on its own, e.g., by itself analyzing network packets, or it can receive this information from other sources in the network, e.g. from network routers or servers. The anomaly detection system, including the activity log, can be centralized or distributed across the network. The activity log can log a variety of user activity, such as user ID, user IP address, the type of network activity being performed by users, a bandwidth used by users, a total amount of data transmitted by users, a total amount of data received by users, a port used by a user to access the network, a port used by network resources to communicate with the user, an IP address of network resources accessed by the user, times of activity, an origin from which the user accesses the network, a permission level necessary to perform user requests, etc.

The analysis engine 111 can analyze the activity log and compare it to user activity to determine if the user activity is anomalous, even if the user has presented the proper authenticating username and password or other credentials. If the analysis engine 111 detects anomalous user activity, the warning generator 113 can generate a warning to a system administrator 115. In some embodiments, the warning generator can take other measures to secure the network, such as revoking access from an individual suspected of anomalous activity, taking resources offline, etc. The warning generator can warn an administrator in different ways, for example, through a daily activity report, through a text message, through an email, or through an immediate alert. The warning generator can communicate through the network to send the warning to the administrator (e.g., send an internal company email through the network), communicate through an external network (e.g., send a text message through a cell phone carrier), or it can directly generate a warning on an administrator computer.

Example Scenarios

For example, in a first embodiment, a corporation can have many different types of resources accessible to different users through a corporate network after the users are authenticated. In the first embodiment, users 103a and 103b are corporate salesmen. In the first embodiment, resource 107a is server containing customer contact information, resource 107b is a server containing product pricing information, and resource 107c contains human resources hiring information. In this first embodiment, salesman 103a might regularly access resource 107a through the network in order to contact clients to make sales. Salesman 013b might also regularly access resource 107a and additionally access resource 107b when giving price quotes to clients. Neither salesman 103a nor 103b ever access human resources hiring information 107c because they do not work in the human resources department. The activity log 109 has logged this previous activity of the salesmen 103a and 103b.

In the first embodiment, suppose a hacker is able to obtain the network credentials of salesman 103a. The hacker begins to download all available information, accessing resource 107a, 107b, and 107c. When this happens, analysis engine 111 can analyze the user activity coming from the computer of salesman 103a. It can first detect that salesman 103a is accessing pricing information resource 107b. In some embodiments, the analysis engine can flag the behavior as anomalous and generate a warning because it is inconsistent with previous activity of 103a. In some other embodiments, the analysis engine can determine, based on the behavior of 103b, that it is normal for salesmen to access pricing information resource 107b.

The analysis engine 111 can flag the activity of salesman 103a as anomalous for accessing human resource information 107c, something that neither salesman has been logged to do. The analysis engine 111 can flag the activity of salesman 103a as anomalous for accessing more than a usual amount of data, accessing the resources at an odd time, accessing the resources from a remote computer in a different location or IP address, or based on a variety of other anomalous conditions inconsistent with previously logged behavior. If the analysis engine has flagged a sufficient amount of suspicious user activity, then a warning can be sent by the warning generator 113 to a network administrator. In some embodiments, a single flag of anomalous user activity (for example, user activity originating from an IP address in a foreign country when the user is actually local) can trigger a warning generation. In some other embodiments, multiple flags of anomalous user activity are required to avoid false positives. For example, a detection of an authorized user accessing resources at a later time can simply be the user performing occasional overtime work, not a hacker, and so other indicators of anomalous activity would be required before a warning is generated.

In the embodiment described, the analysis engine 111 is able to determine that the salesman 103a is similar to salesman 103b, and that "normal" behavior consists of activity regularly performed by either salesman. In performing this analysis, the analysis engine 111 can places similar users into various cohorts in order to analyze what "normal" behavior is for users of that cohort.

Example with Single User and Discussion of Distributed Resources

Figure 2:
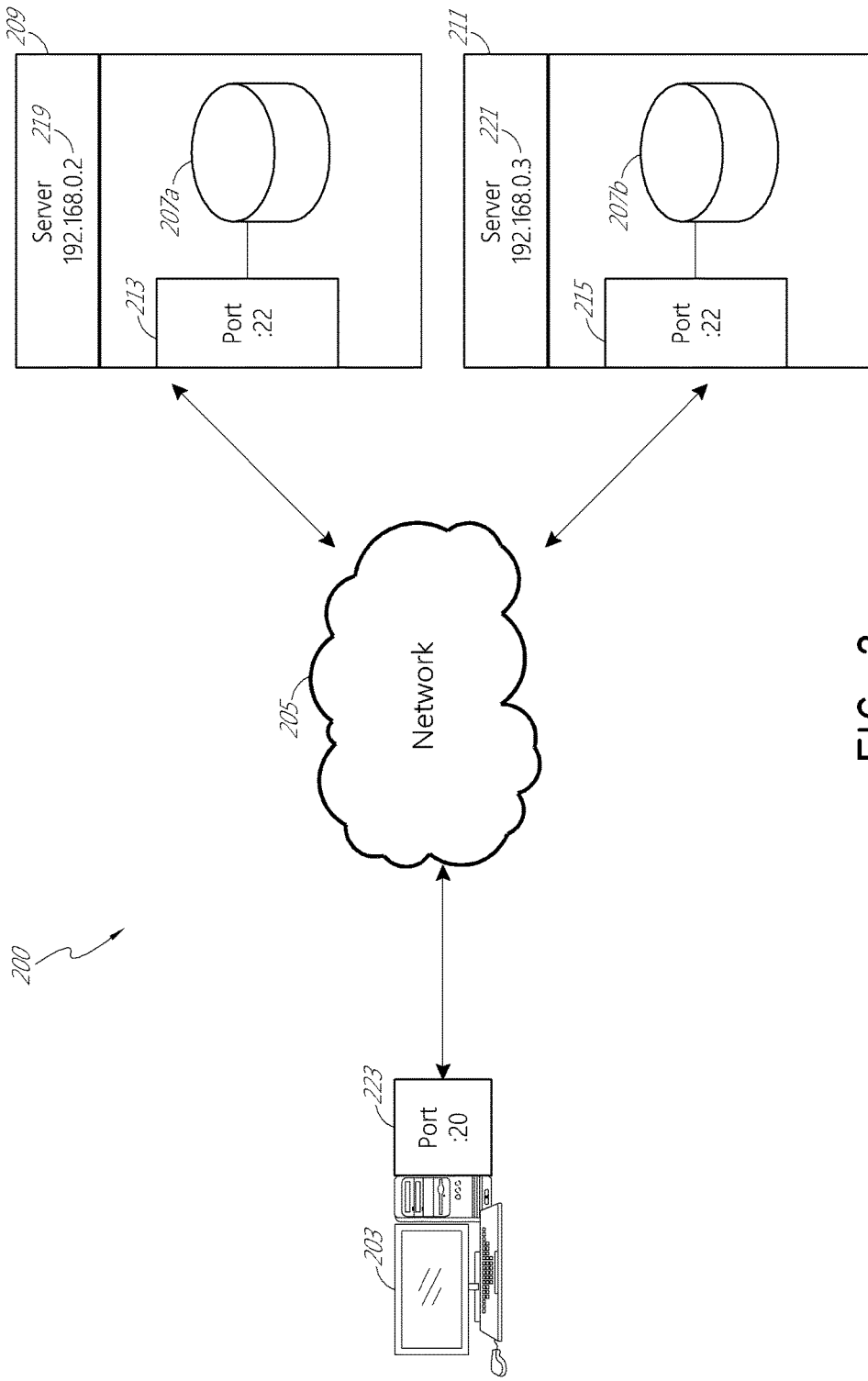
FIG. 2 shows an example of a user in a system featuring distributed resources.

FIG. 2 shows an example of user 203 in a system 200 featuring distributed resources 207a, 207b. A user 203 connects to a network 205 to access a resource 207. The resource is distributed as resources 207a, 207b across servers 209 and 211. A first server 209 has IP address 219. A second server 211 has IP address 221. On first server 209, resource 207a can be accessed through a port 213. On the second server 211, resource 207b can be accessed through a port 215 having the same port number as port 213. The user's 203 computer can access the network resource through a port 223 having a port number 20.

In an example embodiment, resource 207 is tax data. As a precautionary measurement, the system mirrors the tax data on two separate servers 209 and 211 in case one server goes down such that the tax data 207 is duplicated as 207a and 207b. The user 203 regularly initiates a program on the user machine which requests to access the tax data 207 through a port 223 having port number 20 on the user machine. The request gets routed through the network 205 to the first server 209 having IP address 192.168.0.2. The user is able to access the tax data 207a on the first server 209 through a port 213 on the server 209 having port number 22. An anomaly detection system, such as the anomaly detection system 101 of FIG. 1, logs the user ID, port 20 of the user machine, the IP address 192.168.0.2 of the server, and the port 22 of the server. When the user attempts to access resource 207 at a later time, it can get routed instead to a second server 211 having IP address 192.168.0.3, for example, if the first server crashes. The user can access the duplicate tax data 207b through a port 215 of the second server having port address 22. The anomaly detection system 101 can log the user ID, port 20 of the user machine, the IP address 192.168.0.3 of the server, and the port 22 of the server for this second activity. The anomaly detection system can analyze to the logged data to determine that the same user, through the same user port 20 and same server port 22 is accessing the same data because the port numbers for two different servers match despite the servers having different IP addresses. The anomaly detection system 101 can determine that the second access of resource 207b on the second server 211 is therefore normal and not anomalous given the log of the user's previous behavior of accessing the resource 207a on the first server 209 through those same ports 20 and 22. In some embodiments, only a single port on either the user side or the server side is logged and used to determine matches.

In some embodiments, a distributed resource 207 can be an executable program. For example, a user 203 can normally communicate through a port 213 on the first server to run software on the first server 209. The first server can have a finite number of licenses or a finite capacity to run the software. If the first server has no more licenses or processing capacity, the user 203 can run the same software on the second server 211 instead. In some embodiments, a distributed resource can be different parts a resource stored at different locations in a stripe array. In some embodiments, a distributed resource can be multiple instances of a resource distributed at different locations. In some embodiments, distributed resources can refer to similar applications distributed across different hosts as long as the port numbers are the same.

In some embodiments, a distributed resource can be accessed through different IP addresses but a same port number. The port number can be the port 223 number of a user machine or a port 213, 215 number of a server 209, 211. The anomaly detection system can identify that a user is acting normally because the same distributed resource is being accessed, even if a user is accessing the distributed resource through different IP addresses, because the same port number is being used along with other similar identifying information. This can minimize the number of false positive warnings that the anomaly detection system generates. In some embodiments, a different identifying signature (e.g., same file size, same time, same packets, same directory, etc.) of repeated access to the same distributed resource at different locations can be detected and not flagged as anomalous behavior.

It should be recognized that a decision to use port numbers is not an obvious solution. It can be against conventional wisdom in a system that relies, at least in part, on unique identifiers to use a port number when other identifiers better identify a unique activity. For example, a port number alone will not identify the accessed server—information could be identified by an IP address. Nonetheless, using the less unique port number in some embodiments, can nonetheless detect anomalies with increased accuracy.

Cohort Sorting

Figure 3:
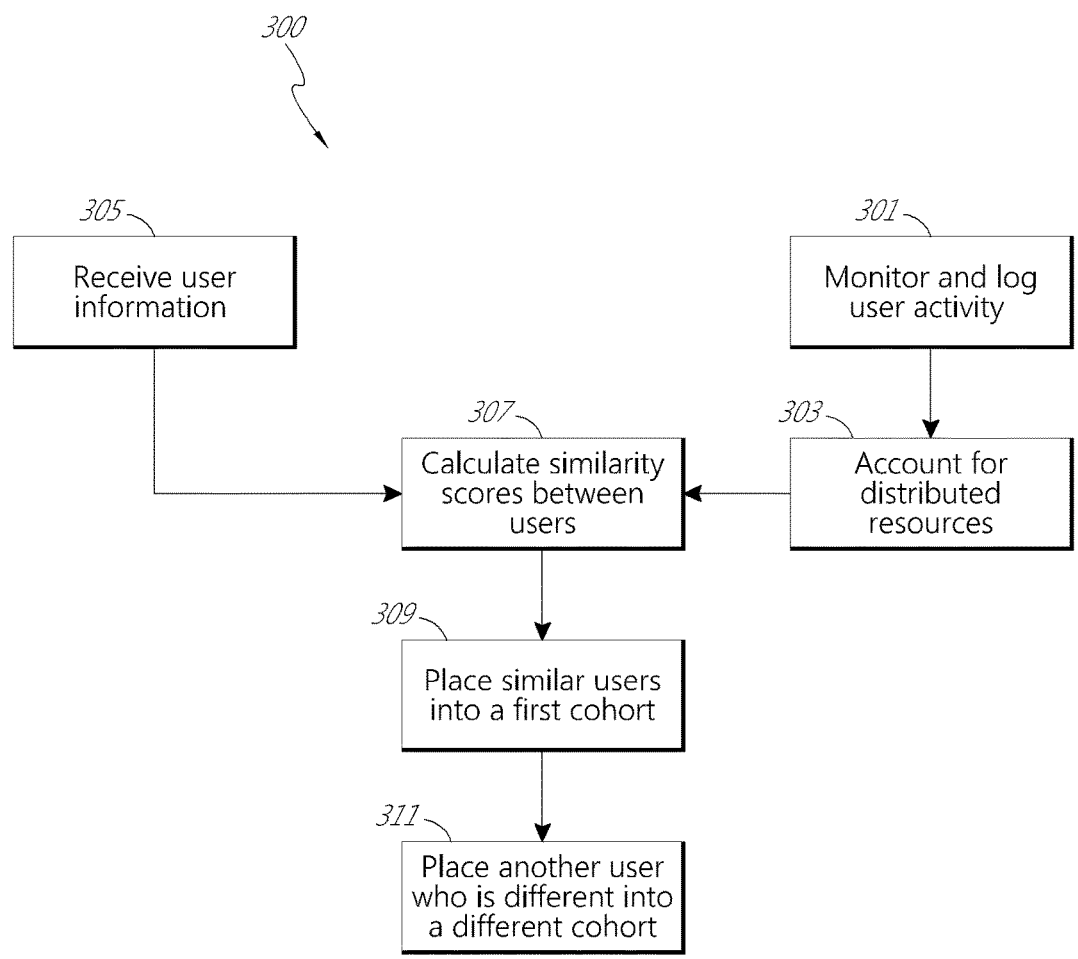
FIG. 3 shows a block diagram of an example method of dynamically placing users into cohorts according to one embodiment.

FIG. 3 shows a block diagram of an example method 300 of dynamically placing users into cohorts according to one embodiment.

At block 301, an anomaly detection system such as anomaly detection system 101 of FIG. 1 can monitor and log user activity. At block 303, the anomaly detection system can account for distributed resources. For example, it can determine that certain resources are the same despite users accessing the resources in different ways (e.g., through different IP addresses).

At block 305, the system can receive user information. User information can include information that helps to sort the users. For example, location, job titles, job descriptions, a corporate hierarchy, email lists, email data, address books, mailing lists, user groups, active directory data, user profile information (e.g., age, location), etc. can be used to help determine which users need to access similar network resources.

At block 307, the system can calculate similarity scores between users. In some embodiments, this can be done, for example, in part by analyzing the user information. In some embodiments, this can be done dynamically by analyzing the activity log. A similarity score can be determined for users based on their history of user activity. Users who access similar resources are assigned a higher score. This can be recalculated as users continue perform additional activity that gets logged. The similarity score can be calculated, for example, by performing an inverse user frequency transform and calculating a Jaccard similarity score or cosine similarity score between the different users. Example calculations are provided in the discussion of FIG. 4.

At block 309, the users can be divided into cohorts based, at least in part, on the similarity score. Similar users with high similarity scores can be placed into the same cohort.

At block 311, another user can be placed a different cohort. This user can have a low similarity score with users of the first cohort. However, this user can have high similarity scores with other members of the different cohort.

In some embodiments, a user can be placed into more than one cohort. For example, a network user who is an accountant can get placed in a first cohort with tax attorneys and also placed in a second cohort with inventory managers. In some embodiments, user information can be used to finalize the cohort placement. For example, a large group of users can have high similarity scores with each other. The received user information can indicate that those users are either contractors or employees, and so the finalized cohort can divide the users along those lines. In another embodiment, the received user information is used as part of the calculation so that the similarity score between users accounts for whether they hold the same job title.

The dynamic placement of users into cohorts based on an analysis of the activity log can yield better results than simply based on user information alone. For example, a network many have 1000 users who hold the job of "contractor." These contractors can in fact access very different network resources to perform very different job functions. Other data, such as job descriptions, job titles, corporate directories, etc. can become out of date. For example, a successful engineer hired to design a product can initially access technical resources in a network but later perform product marketing due to his superior product knowledge, and the engineer can instead begin to routinely access marketing resources in a network. A dynamic system can continue to log user activity, calculate new similarity scores, and adjust the cohort groupings or place users into new ones. Furthermore, such a dynamic system can log the necessary data on its own without needing to receive user information or require manual intervention.

Data Examples

Figure 4:
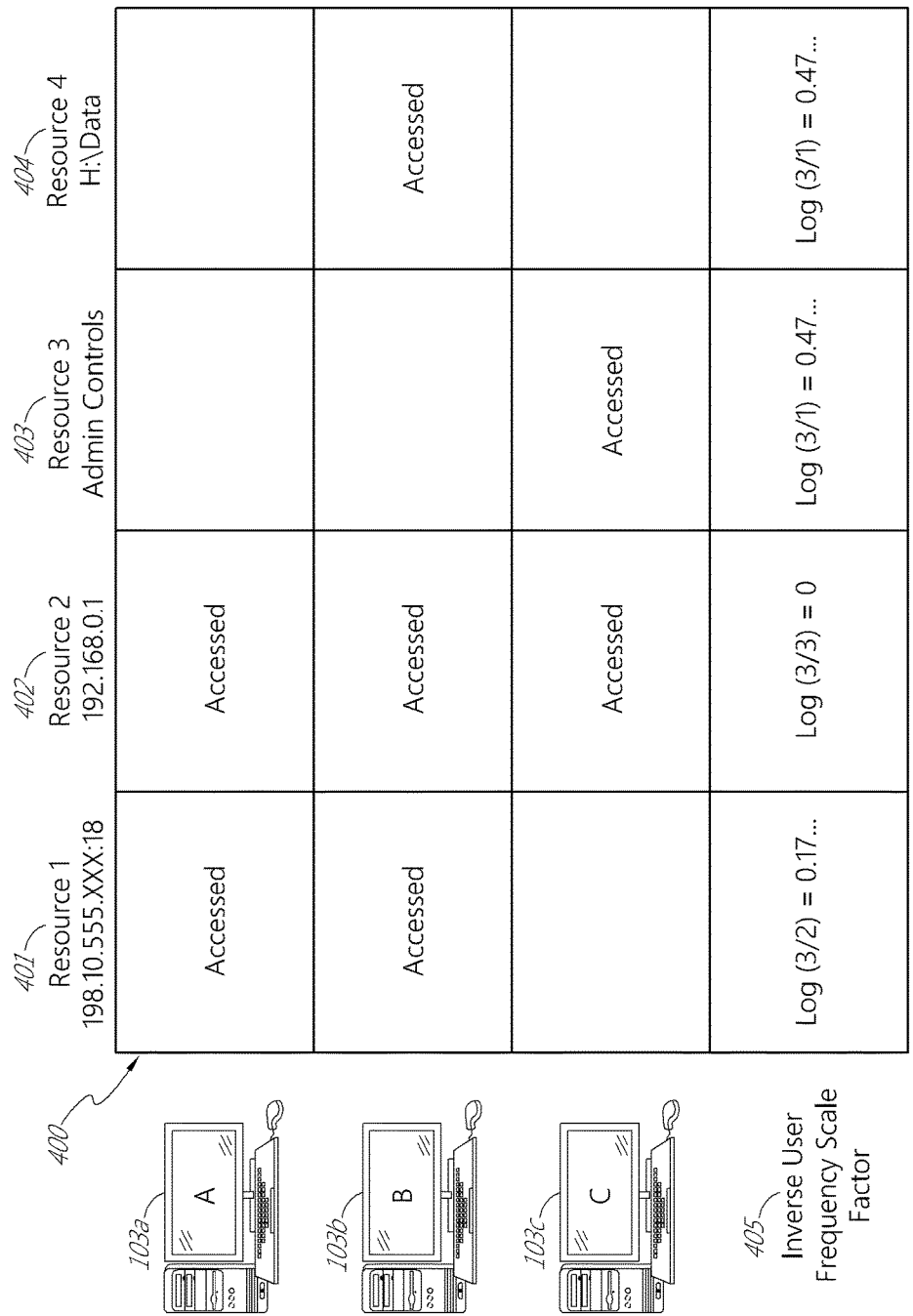
FIG. 4 shows an example of logged user activity data in a table structure according to one embodiment.

FIG. 4 shows an example of logged user activity data in a table structure 400 according to one embodiment. Activity for user 103a is logged in the first row of the table 400. Activity for user 130b is logged in the second row of the table. Activity for user 103c is logged in the third row of the table. Resources 401, 402, 403, and 404 are listed as column headings across the top of the table.

In the example, user activity is logged as whether or not a user accessed a resource. Resource 1 is a distributed resource and is identified by a partial IP and a port. Resource 401 can be distributed across a plurality of servers having different IP addresses that begin with 198.10.555 and is accessed through port 18. Resource 402 is a resource accessed at IP address 192.168.0.1. In the example embodiment, resource 402 can be a network home page. Resource 403 is the network administrative controls. Resource 404 is the network directory "H:\Data."

The logged data indicates that user 103a has accessed resource 401 and 402. User 103b has accessed resource 401, 402, and 404. User 103c has accessed resource 402 and 403.

Scale Factors

An inverse user frequency scale factor 405 can be calculated. This can be used to determine the importance of an access to a resource. The inverse user frequency scale factor can be calculated to indicate the relative significance of an access to a resource. Resources frequently accessed by many users are less important in a similarity calculation. For example, the users 103a, 103b, and 103c all access the resource 2, the network home page at IP address 192.168.0.1 as a default browser home page. This logged data has relatively less value than other logged data in determining similarity.

One example formula for calculating an inverse user frequency scale factor for a given resource is according to the equation:

$$\text{Scale Factor} = 1 - \frac{\text{Accesses}}{\text{Users}} \quad \text{Eq. 1}$$

The total number of accesses to a resource is divided by the total number of possible users who could have accessed the resource. The result is then subtracted from 1.

Another example formula for calculating an inverse user frequency scale factor for a given resource is according to the equation:

$$\text{Scale Factor} = \text{Log}\left(\frac{\text{Accesses}}{\text{Users}}\right) \quad \text{Eq. 2}$$

The Log is taken of the number of users divided by the number of access to the resource. This can generate a scale factor that gives greater weight to unique resource accesses. Here and elsewhere, the Log base can be various numbers.

The table 400 shows the inverse user frequency scale factor 405 calculated according to Eq. 2 for the logged data. Resource 401 is assigned a scale factor of approximately 0.17. Resource 402 is assigned a scale factor of 0. This reflects its relative lack of importance, because accessing a network home page is a typical activity of many users and not a good indicator of anomalous activity. Resources 403 and 404 are assigned scale factors of approximately 0.47.

Jaccard Example

In some embodiments, a Jaccard similarity score can be calculated for the users. The Jaccard similarity score between two users A and B can be calculated according to the equation:

$$\text{Similarity Score} = \frac{\text{size}(A \cap B)}{\text{size}(A \cup B)} \quad \text{Eq. 3}$$

The size of the intersection of resources accessed between user A and user B is divided by the size of the union of resources accessed for user A and user B. This produces a result between 0 and 1.

Applied to the logged user activity shown in table 400 without scale factors, user 103a and user 103b both accessed resources 401 and 402, so the size of the intersection of resources accessed is 2. The union of resources accessed by user 103a and user 103b includes resources 401, 402, and 404, so the size of the union of resources accessed is 3. The similarity score for users 103a and 103b would be calculated as ⅔.

User 103a and user 103c both accessed resource 402, so the size of the intersection of resources accessed is 1. The union of resources accessed by user 103a and user 103c includes resources 401, 402, and 403, so the size of the union of resources accessed is 3. The similarity score for users 103a and 103c would be calculated as ⅓.

User 103b and user 103c both accessed resources 402, so the size of the intersection of resources accessed is 1. The union of resources accessed by user 103b and user 103c includes resources 401, 402, 403, and 404, so the size of the union of resources accessed is 4. The similarity score for users 103b and 103c would be calculated as ¼.

In an embodiment using the Jaccard similarity scores without scale factors, user 103a and user 103b would have the highest similarity score of approximately 0.67, and users 103b and 103c would have the lowest similarity score of 0.25.

Applied to the logged user activity shown in table 400 with scale factors to both the union and the intersection, user 103a and user 103b both accessed resources 401 and 402, so the size of the intersection of resources accessed is (0.17+0). The union of resources accessed by user 103a and user 103b includes resources 401, 402, and 404, so the size of the union of resources accessed is (0.17+0+0.47). The similarity score for users 103a and 103b would be calculated as 0.17/0.64 or about 0.27.

User 103a and user 103c both accessed resource 402, so the size of the intersection of resources accessed is 0. The union of resources accessed by user 103a and user 103c includes resources 401, 402, and 403, so the size of the union of resources accessed is (0.17+0+0.47). The similarity score for users 103a and 103c would be calculated as zero.

User 103b and user 103c both accessed resources 402, so the size of the intersection of resources accessed is 0. The union of resources accessed by user 103b and user 103c includes resources 401, 402, 403, and 404, so the size of the union of resources accessed is (0.17+0+0.47+0.47). The similarity score for users 103b and 103c would be calculated as zero.

In an embodiment using the Jaccard similarity scores with scale factors applied to both the union and the intersection, user 103a and user 103b would have the highest similarity score of approximately 0.27, and all other user combinations have a similarity score of zero.

In some embodiments, the scale factor can be applied to one of the union calculation or the intersection calculation in determining the Jaccard similarity score.

Cosine Examples

In some embodiments, a cosine similarity score can be calculated for the users. The cosine similarity score between two users A and B can be calculated according to the equation:

$$\text{Similarity Score} = \frac{\overline{X} \cdot \overline{Y}}{\|\overline{X}\| \cdot \|\overline{Y}\|} \quad \text{Eq. 4}$$

In equation 4, where $\overline{X}$ is a vector of resources accessed by a first user and $\overline{Y}$ is a vector the resources accessed by a second user, the dot product of the vectors is divided by the product of the magnitude of the vectors.

An example is provided without using scale factors. Applied to the logged user activity shown in table 400 for user 103a and user 103b, the numerator is (1×1+1×1+0×0+0×1) or 2. The denominator is $\sqrt{1+1+0+0} \cdot \sqrt{1+1+0+1}$ or approximately 2.45. The cosine similarity score for the users would be approximately 0.82.

For user 103a and user 103c, the numerator would be (1×0+1×1+0×1+0×0) or 1. The denominator is $\sqrt{1+1+0+0} \cdot \sqrt{0+1+1+0}$ or 2. The cosine similarity score for the users would be 0.5.

For user 103b and user 103c, the numerator would be (1×0+1×1+0×1+1×0) or 1. The denominator is $\sqrt{1+1+0+1} \cdot \sqrt{0+1+1+0}$ or approximately 2.45. The cosine similarity score for the users would be approximately 0.41.

In an embodiment using the cosine similarity scores without scale factors, user 103a and user 103b would have the highest similarity score of approximately 0.82, and users 103b and 103c would have the lowest similarity score of 0.41.

In some embodiments, the scaling factors can likewise be applied to the vector values when performing a cosine similarity score calculation, and the scaling factors can be applied to the numerator, denominator, or both. In some embodiments, a different equation can be used to calculate the similarity score.

In some embodiments, the data used can be non-binary data. For example, instead of comparing whether or not a resource was accessed, the similarity score can be calculated based on the amount of data transferred to access resource, a time that activity took place, etc.

In some embodiments, a similarity score can be calculated between all users in a network in order to determine which groups of users are the most similar to each other.

Cohort Examples

Figure 5:
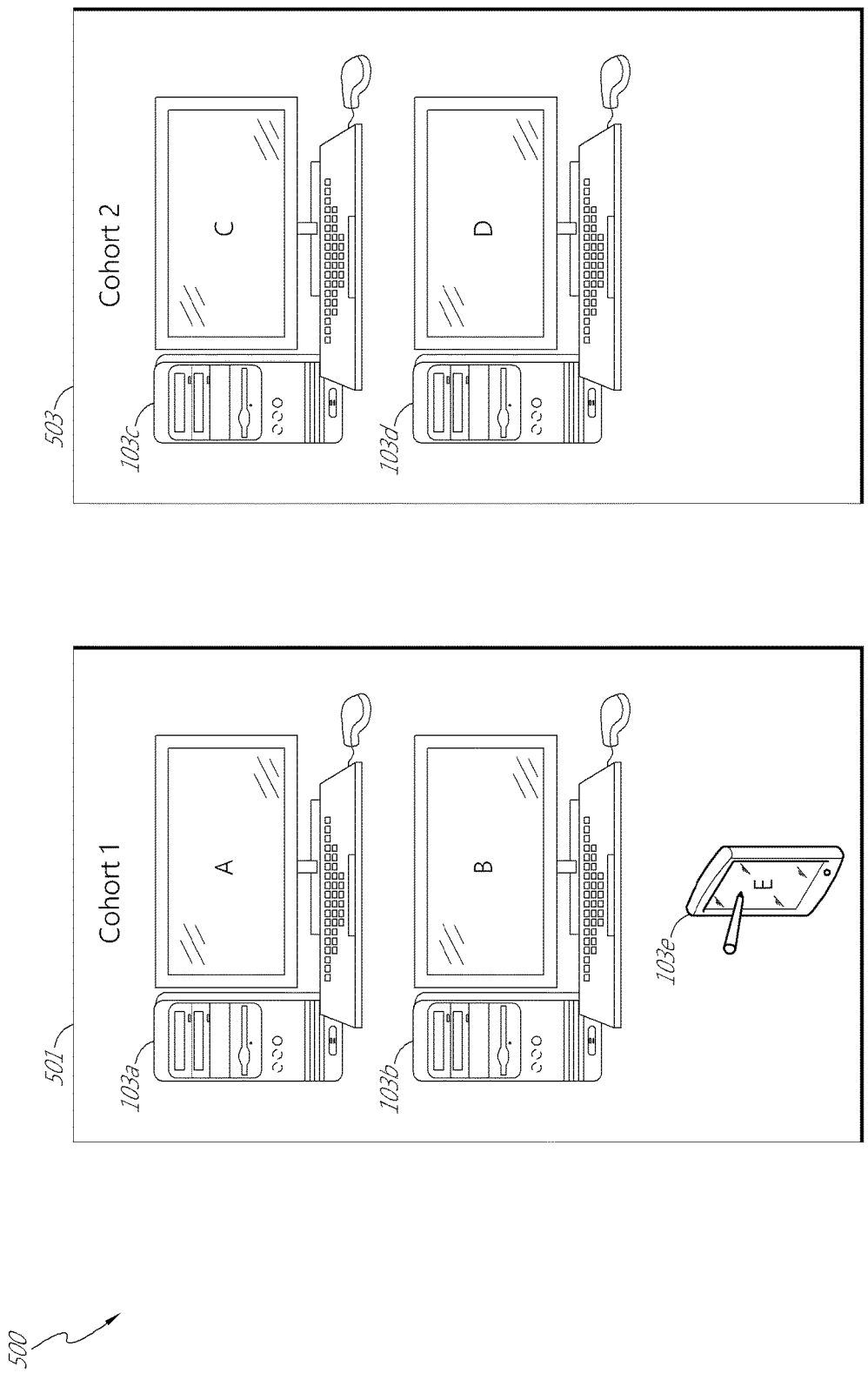
FIG. 5 shows an example of users assigned to cohorts according to one embodiment.

FIG. 5 shows an example 500 of users assigned to cohorts according to one embodiment. This can result, for example, from performance of method 300. Users 103a, 103b, and 103e are grouped into a first cohort 501. Users 103c and 103d are grouped into a second cohort 503.

The groupings can occur based on similarity scores and received user information. For example, users 103a, 103b, and 103e can have high similarity scores and they all hold similar job titles, perform similar tasks, are described similarly in an active directory, and access the same resources over the network. In the other cohort, users 103c and 103d can have high similarity scores between each other but lower similarity scores with the users 103a, 103b, and 103e.

By grouping users into cohorts, the anomaly detection system is better able to compare user activity to logged activity of similar users to determine if the user activity is anomalous.

In some embodiments, the cohorts can be readjusted and users will be reassigned based on additional logged user activity. The cohort sizes can also vary, and the sizes can also dynamically change with new logged activity. In some embodiments, cohorts can be of a fixed size, such as 5, 10, 15, 20, 25, 30, 40, 50 100, 200, 250, 500, 750, or 1000 users. In some embodiments, cohorts can be a mix of sizes. For example, a CEO of a company can be in a unique cohort, or a very small cohort with other C-level network users. On the other hand, the same company can have thousands of customer service representatives, and the cohort size for the customer service representatives can be very large. In some embodiments, users can be assigned to more than one cohort. For example, a user can be assigned to a cohort based on similar job descriptions with other users, another different cohort based on accessing similar resources with a first group, another different cohort based on accessing similar resources to a second group, and a different cohort based on the location of the user.

Example with Multiple Users

Figure 6:
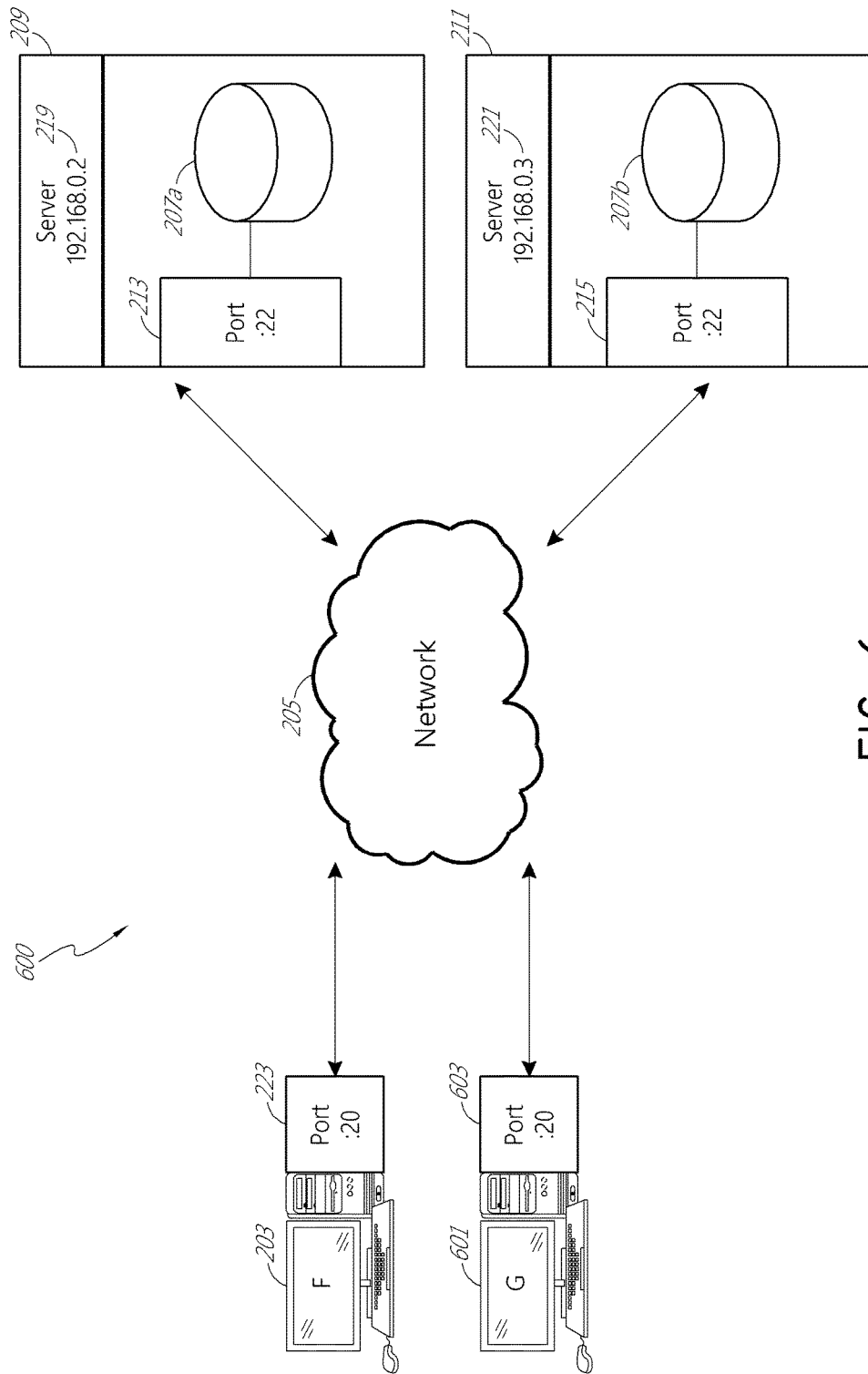
FIG. 6 shows an example of two users in a system featuring distributed resources.

FIG. 6 shows an example of two users 203, 601 in a system 600 featuring distributed resources 207a, 207b. A user 203 connects to a network 205 to access a resource 207. A second user 601 connects to the network 205 to access a resource 207. The resource 207 is distributed as resources 207a, 207b across servers 209 and 211. A first server 209 has an IP address 219. A second server 211 has an IP address 221. On the first server 209, resource 207a can be accessed through a port 213. On the second server 211, resource 207b can be accessed through a port 215 having the same port number as port 213. The user's 203 computer can access the network resources using a port 223 having a port number 20. The second user's 601 computer can access the network resources using port 603 having a port number 20.

In an example embodiment, resource 207 is tax data mirrored on two separate servers 209 and 211. The user 203 regularly accesses the tax data 207 through a port 223 having port number 20 on the user machine. The request gets routed through the network 205 to the first server 209 having IP address 192.168.0.2. The user is able to access the tax data 207a on the first server 209 through a port 213 on the server 209 having port number 22. An anomaly detection system, such as the anomaly detection system 101 of FIG. 1, logs the user ID, port 20 of the user machine, the IP address 192.168.0.2 of the server, and the port 22 of the server.

In the example embodiment, a second user 601 attempts to access resource 207 for the first time. The second user's 601 access can get routed to a second server 211 having IP address 192.168.0.3, for example, if the second user 601 happens to be physically closer to the second server 211 or if the first server 209 is busy. The anomaly detection system 101 can log the user ID, port 20 of the user machine, the IP address 192.168.0.3 of the server, and the port 22 of the server for access of 207b by the second user 601. The anomaly detection system can analyze to the logged data to determine that the second user 601 is acting anomalous.

If user 601 and user 203 belong to the same cohort, the anomaly detection system can determine based on the logged activity for user 203 that accesses to resource 207 is normal for cohort members. The anomaly detection system can analyze the logged user activity and determine that resource 207 is a distributed resource accessed through port 22 on a server. The anomaly detection system can then determine that the activity of user 601, despite being previously unlogged activity to server 192.168.0.3 by user 601, is merely routine activity of a cohort member to access resource 207b in a cohort whose members routinely access the same distributed resource 207.

If instead, user 601 is not a part of the same cohort as user 203, then the anomaly detection system can analyze the logged user activity and see that user 601 is performing anomalous user activity. Although accessing resource 207 is normal for user 203, doing so is not normal for user 601. This would even be true if user 601 were attempting to access, for the first time, resource 207a on server 209. The anomaly detection system can flag the anomalous user activity and generate a warning.

Example Method Detecting Anomalous Unique Activity

Figure 7:
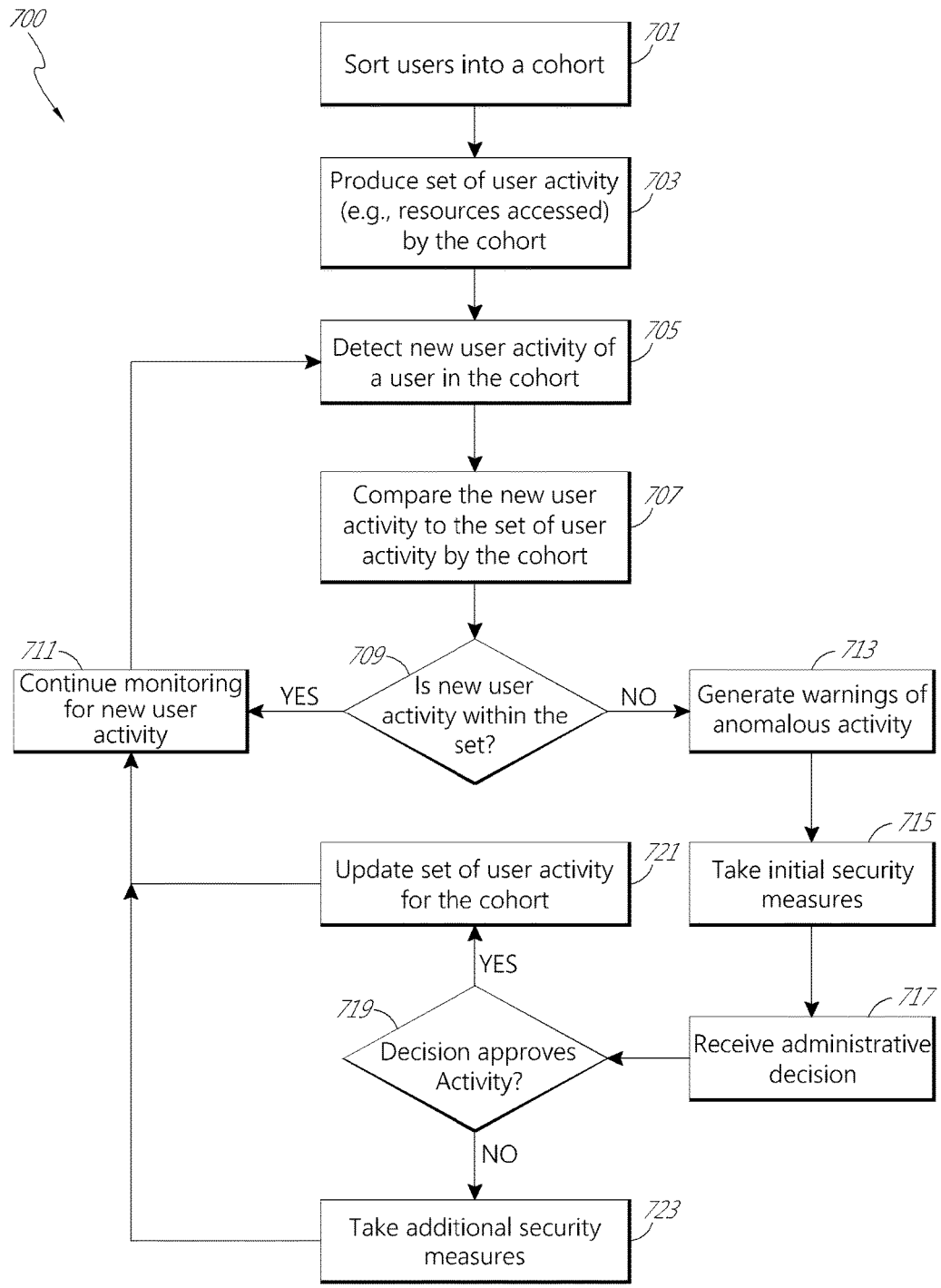
FIG. 7 shows a block diagram of an example method for detecting and warning of anomalous network activity according to one embodiment.

FIG. 7 shows a block diagram of an example method 700 for detecting and warning of anomalous network activity according to one embodiment. At block 701, users can be sorted into a cohort. At block 703, a set of user activity can be produced that includes user activity of all users in the cohort. The set of user activity can be, for example, a set of resources accessed by any member of the cohort. The set can include distributed resources. At block 705, new activity by a cohort member is detected. At block 707, the new activity can be compared to the set of user activity. At block 709, it can be determined if the new activity is within the set of user activity. This can include, for example, determining if a new activity is an access to a distributed resource that is included in the set.

If the new activity is within the set of user activity, then the new activity is normal. At block 711, new user activity can continue to be monitored and logged.

If, on the other hand, the new activity is not within the set of user activity, then the new activity is anomalous. At block 713, a warning can be generated to warn of the anomalous activity. In some embodiments, the user activity is flagged as anomalous without generating a warning, and only after enough flagged activities accumulate does a warning get generated. At block 715, initial security measures can be taken. These can include automatic security measures that partially, but do not completely, disrupt the workflow of the anomalous user, for example, limiting the bandwidth or total data that the anomalous user can access, requiring the anomalous user to re-authenticate a username and password, generating a communication to a phone number or email to the user alerting them of suspicious activity on their user account, logging in detail activity of the user, tracing additional characteristics of the user activity (e.g., location, speed, signs of automation), running a virus scan on the anomalous user's machine, etc. These initial security measures can also include more drastic security measures such as restricting the anomalous user's access to a resource, disabling the anomalous user access to a resource, etc. These initial security measures can take place until an administrative decision is received regarding the user activity at block 717. The administrative decision can come from, for example, a network administrator, or it can come from, for example, the user suspected of anomalous activity after receiving additional verification of the user's identity such as through two factor authentication. The decision can either approve or disapprove of the new user activity at block 719.

If the new user activity is approved as normal, then at block 721, the new user activity can be added to the set of user activity for the cohort, and in the future, it will not be flagged as potentially anomalous. The system can continue to monitor for new user activity at block 711.

If, however, the new activity is reviewed and deemed to be unauthorized network activity, the decision received might not approve the new user activity. At block 723, additional security measures can be taken. For example, the user's network access can be restricted or disabled, an attempt can be made to determine the true location and identity of the user, authorities can be alerted, recent network activity by the unauthorized user can be reversed, etc.

Example Method Detecting Anomalous Previously Performed Activity

Figure 8:
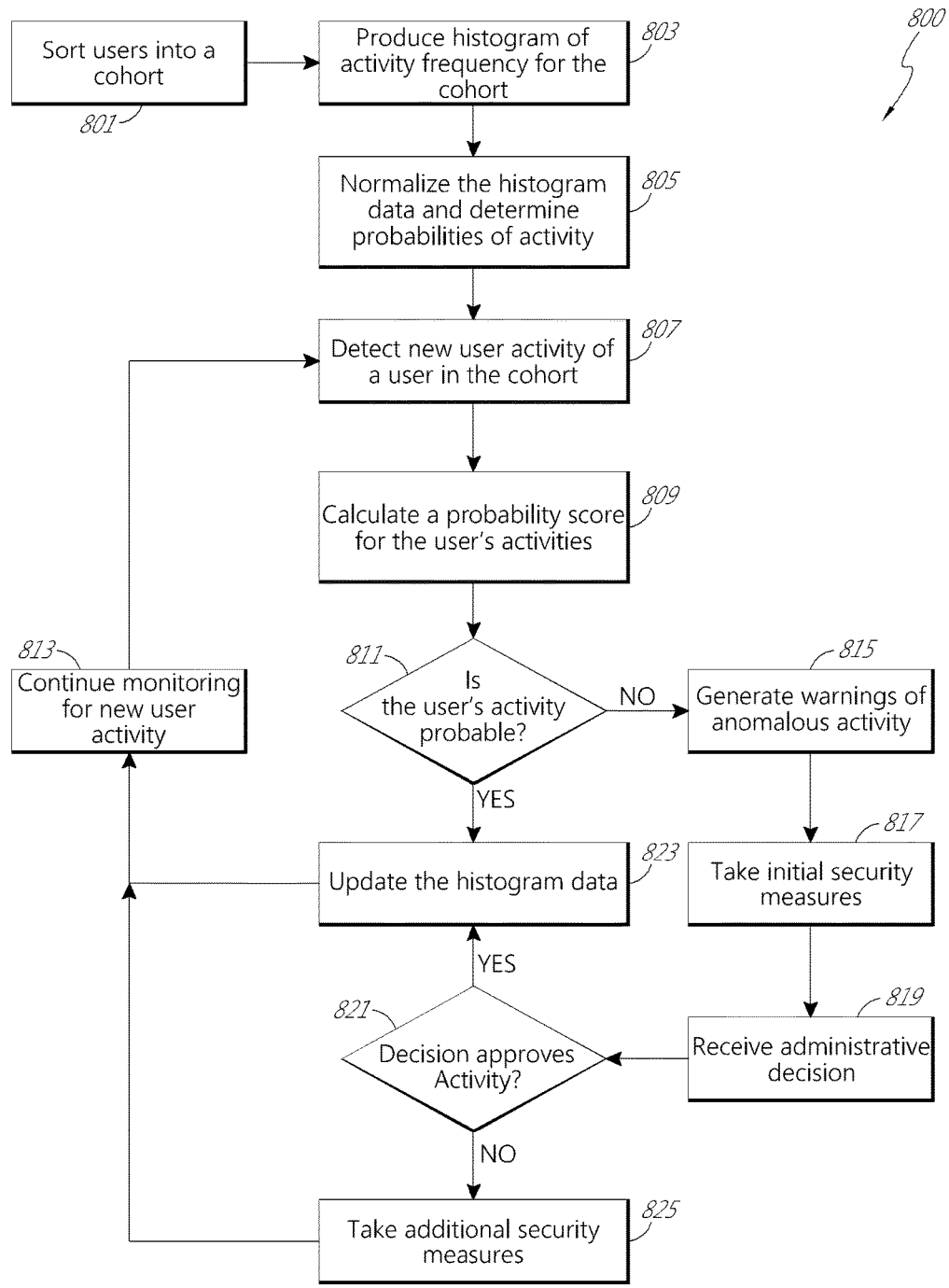
FIG. 8 shows a block diagram of an example method for detecting and warning of anomalous network activity according to one embodiment.

FIG. 8 shows a block diagram of an example method 800 for detecting and warning of anomalous network activity according to one embodiment. The method 700 can detect anomalous an anomalous user access of a resource previously not accessed by a cohort. The additional innovations disclosed in example method 800 allow detection of anomalous user activity even when accessing resources that have been previously accessed by the cohort. Furthermore, example method 800 discloses a specific solution to the problem, "How can I tell if this previous performed activity is anomalous?" in a method that can be performed on a computer.

At block 801, similar users are sorted into a cohort. This can include, in part, performing a Jaccard similarity calculation or cosine similarity calculation. At block 803, logged data of the cohort members is analyzed to produce a histogram of the frequency of certain types of user activity. This can include, for example, resource access, port usage, etc. Initially, the logged data can include data that was previously logged and previously used to sort the users into cohorts. Data can continue to be logged after the users are sorted into cohorts. In some embodiments, data can be logged at a time starting after the users have been sorted into cohorts. This can happen, for example, after logging a sufficient amount of data, or if a long time has passed since the users were sorted into cohorts.

At block 805, the histogram data can be normalized to determine the probability of an activity. For example, if cohort members rarely access resources ABC only 1% of the time but frequently access resources XYZ 99% of the time, then the probability of an access to XYZ is 99%, and the probability of an access to ABC is 1%.

At block 807, new user activity of a user in the cohort is detected.

At block 809, a probability score for the user's activity is determined. This can be determined with reference to the normalized data. Continuing the example, if the new user activity is an access to ABC, then the probability score is low, such as 1%. In other embodiments, the probability score for the user's activity is determined based on the user's historical data combined with the user's new activity. For example, if the user previous accessed XYZ 99 times and just now accessed ABC, then the user's overall history probability score is relatively high. On the other hand, if the user previously accessed XYZ 50 times and also previously accessed ABC 50 times and is now accessing ABC again, then the user's overall history probability score is relatively low.

In some embodiments, the user's probability score for a history of user activity can be calculated according to the equation:

$$\text{Probability Score} = \frac{\sum P(A, U)}{\text{\# Activity Events}} \qquad \text{Eq. 5}$$

Where P(A,U) represents the probability P of a user U performing an activity (e.g., accessing a resource, using a certain port, etc.). The sum of the probabilities P for each past activity A of the user U is summed up and divided by the total number of activity events.

In some embodiments, the user's probability score for a history of user activity can be calculated using the Kullback-Leibler (KL) Divergence principle according to the equation:

$$\text{Divergence} = \sum_A P(A\mid C)\text{Log}\frac{P(A\mid C)}{P(A\mid U)} \qquad \text{Eq. 6}$$

The divergence is equal to the sum for all activities A of the probability of an action A given a cohort C times the log of the probability of an action A given cohort C divided by the probability of action A given a user U. In an application, for each activity A (e.g., access to a resource) performed by members of a cohort C, the sum is calculated of the probability of a cohort member C performing that activity A multiplied by the Log of the probability of a cohort member C performing that activity A divided by the probability of the user U performing that activity A. The resulting divergence can be as a probability score or converted into a probability score.

In some embodiments, the Log function can be an Ln function or have a different base, the cohort's divergence from the user can be calculated instead of the user's divergence from the cohort, or other applications of the principle can be used.

At block 811, it can be determined if the user's activity is probable or not. This can be done, for example, by comparing the probability score to a threshold level.

If the user's activity is probable, then at block 823, the histogram data can be dynamically updated to account for the new user activity, and the probabilities of activity are updated. At block 813, the system can continue to monitor for new user activity.

If, on the other hand, the user's activity is not probable, then the activity is anomalous. At block 815, a warning can be generated to warn of the anomalous activity. In some embodiments, the user activity is flagged as anomalous without generating a warning, and only after enough flagged activities accumulate does a warning get generated. At block 817, initial security measures can be taken. These can include automatic security measures that partially, but do not completely, disrupt the workflow of the anomalous user, for example, limiting the bandwidth or total data that the anomalous user can access, requiring the anomalous user to re-authenticate a username and password, generating a communication to a phone number or email to the user alerting them of suspicious activity on their user account, logging in detail the activity of the user, tracing additional characteristics of the user activity (e.g., location, speed, signs of automation), running a virus scan on the anomalous user's machine, etc. These initial security measures can also include more drastic security measures such as restricting the anomalous user's access to a resource, disabling the anomalous user access to a resource, etc. These initial security measures can take place until an administrative decision is received regarding the user activity at block 819. The administrative decision can come from, for example, a network administrator, or it can come from, for example, the user suspected of anomalous activity after receiving additional verification of the user's identity such as through two factor authentication. The decision can either approve or disapprove of the new user activity at block 821.

If the new user activity is approved as normal, then at block 823, the histogram data can be updated to account for the new user activity, and the probabilities of activities are updated. The system can continue to monitor for new user activity at block 813.

If, however, the new user activity is reviewed and deemed to be unauthorized network activity, the decision received might not approve the new user activity. At block 825, additional security measures can be taken. For example, the user's network access can be restricted or disabled, an attempt can be made to determine the true location and identify of the user, authorities can be alerted, recent network activity by the unauthorized user can be reversed, etc.

Example Method Using Origins

Figure 9:
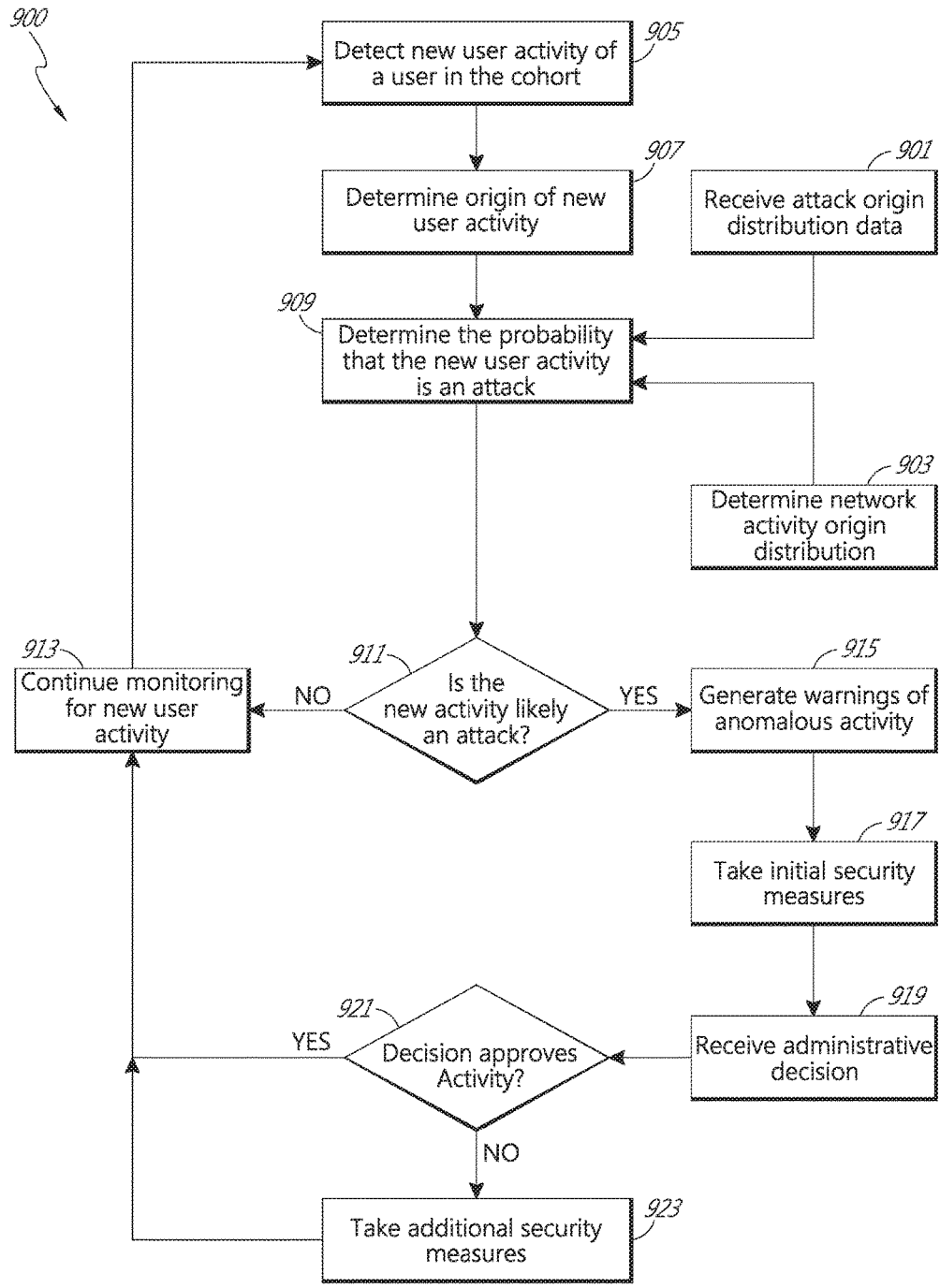
FIG. 9 shows a block diagram of an example method for detecting and warning of anomalous network activity according to one embodiment.

FIG. 9 shows a block diagram of an example method 900 for detecting and warning of anomalous network activity according to one embodiment. The method 900 can detect anomalous user activity based on the origin of the user activity. Certain embodiments include the inventive realization that network activity arising in certain countries has a higher probability of being anomalous and provide for a computer-implementable solution to quantify such a probability.

At block 901, attack origin distribution data is received. This can come from, for example, statistics provided from consulting or security firms. As an example, 5% of all network attacks come from Country AAA, 4% of all network attacks come from Country BBB, 3% of all network attacks come from America, 3% of all network attacks come from Country CCC, etc. When a complete set of attack origin distribution data for all countries cannot be obtained from a single source, the data can be aggregated from multiple sources. The data can be supplemented interpolating data points for missing countries based on relative danger levels. For example, Country DDD is known to be about as dangerous as Country AAA or Country BBB in terms of network attacks. Country DDD can be assigned an attack distribution from about 4% (same as Country BBB) to about 5% (same as Country AAA). For example, Country DDD can be assigned an attack distribution of 4%, 4.5%, 5%, etc. In addition, the attack distributions can be based, in part, on lists of potentially dangerous countries (e.g., countries that the U.S. is currently at war with, countries on a terrorism list, countries sanctioned by the United Nations). The countries on these lists can receive a minimum attack distribution or otherwise have their attack distribution adjusted to account for the risk. These distributions can indicate the probability of any country being the source of an attack and represented as P(C|A).

At block 903, the network activity origin distribution can be determined. This can be determined uniquely for each network implementing an anomaly detection system. This data can be collected, for example, by analyzing the user activity to determine the origin of user activity over a period of time. For example, a local American business that deals with American suppliers, American workers, and American employees can have 100% of its network access originate in America. The country of origin can be determined, at least in part, by the IP address from which a network is accessed, the latency of access to a network (lower latency can indicate closer distances), the time of day during which activity occurs, etc. In another example, a large international company can have 30% of its network access originate from America, 25% of its network access originate from Country AAA, 25% from Country BBB, and 20% from Country CCC, and 0% from Country DDD. In some embodiments, this activity origin distribution can be determined for each cohort. In some embodiments, the activity origin distribution can be determined for connections to different parts of a network. For example, the activity origin distribution can be determined for a network in America and separately determined for a network in a foreign country, or it can be determined for accesses to a database in English and separately determined for access to a database in a foreign language, etc.

At block 905, new user activity is detected. In some embodiments, the user can be a part of a cohort for which the distribution of user activity origin has been determined. At block 907, the origin of the new user activity is determined. This can be done, for example, based on the user's IP address or other techniques.

At block 909, the probability that the new user activity is an attack can be determined. The determining can be done based, at least in part, on the determined origin of the new user activity, the network activity origin distribution (e.g., for the entire network, for a part of the network, or for the user's cohort), and the attack origin distribution data. The probability that the new user activity is an attack can be determined according to the equation:

$$P(A \mid C) = \frac{P(C \mid A)P(A)}{P(C)} \quad \text{Eq. 7}$$

The probability of an attack A given a country C is equal to the probability of a country C given an attack A multiplied by the probability of an attack A divided by the probability of a country C. In an application, the probability that activity determined to be from country C is an attack A is equal to the probability that country C is the source of an attack A multiplied by the probability of an attack A on the network divided by the probability of activity coming from country C. The probability of an attack on the network P(A) can be a constant for networks that are under a constant threat of attacks, but this variable can also change, for example, when the rate of attacks on the network increases or decreases. In the following examples, P(A) is assumed to be constant, or at least it will be later factored out when making a comparison, so it is dropped from the equation. In an example embodiment applying the equation, the probability that the new user activity determined to be from country C is an attack is equal to the distribution of attacks coming from that country divided by the probability of network activity coming from country C.

Referring to the example with the local American business that has all of its network activity originate in America, if new user activity is determined to come from America, where 3% of all network attacks originate from, the probability of that new activity being an attack is equal to 3%/100%, or 0.03. If new user activity is determined to come from a foreign Country AAA from where 5% of all network attacks originate, then the probability of that new activity being an attack is equal to 5%/0% or 5%/(0%+1 access) depending on whether or not the last access is included in the total network access distributions, and the result is a very large number (or divide by zero) indicative of anomalous network activity.

Referring to the example with the large international company, if new user activity is determined to come from America, where 3% of all network attacks originate from, the probability of that new activity being an attack is equal to 3%/30%, or 0.1. If new user activity is determined to come from a foreign Country AAA from where 5% of all network attacks originate, then the probability of that new activity being an attack is equal to 5%/25% or 0.2. Comparing the example of the large international company to the previous example with the local American company, activity originating from foreign country AAA reflect a lower probability of a network attack for the large international company because a part of its authorized network access originates from country AAA.

At block 911, the probability that the new user activity is an attack can be compared to a threshold value to determine if the new activity is likely an attack.

If the new user activity is probably not an attack, then at block 913, new user activity can continue to be monitored and logged.

If, on the other hand, the user's activity is probably an attack, then the activity is anomalous. At block 915, a warning can be generated to warn of the anomalous activity. In some embodiments, the user activity is flagged as anomalous without generating a warning, and only after enough flagged activities accumulate does a warning get generated. At block 917, initial security measures can be taken. These can include automatic security measures that partially, but do not completely, disrupt the workflow of the anomalous user, for example, limiting the bandwidth or total data that the anomalous user can access, requiring the anomalous user to re-authenticate a username and password, generating a communication to a phone number or email to the user alerting them of suspicious activity on their user account, logging in detail activity of the user, tracing additional characteristics of the user activity (e.g., location, speed, signs of automation), running a virus scan on the anomalous user's machine, etc. These initial security measures can also include more drastic security measures such as restricting the anomalous user's access to a resource, disabling the anomalous user access to a resource, etc. These initial security measures can take place until an administrative decision is received regarding the user activity at block 919. The administrative decision can come from, for example, a network administrator, or it can come from, for example, the user suspected of anomalous activity after receiving additional verification of the user's identity such as through two factor authentication. The decision can either approve or disapprove of the new user activity at block 921.

If the new user activity is approved as normal, then at block 913, the system can continue to monitor for new user activity.

If, however, the new user activity is reviewed and deemed to be unauthorized network activity, the decision received might not approve the new user activity. At block 923, additional security measures can be taken. For example, the user's network access can be restricted or disabled, an attempt can be made to determine the true location and identity of the user, authorities can be alerted, recent network activity by the unauthorized user can be reversed, etc.

Example General Method

Figure 10:
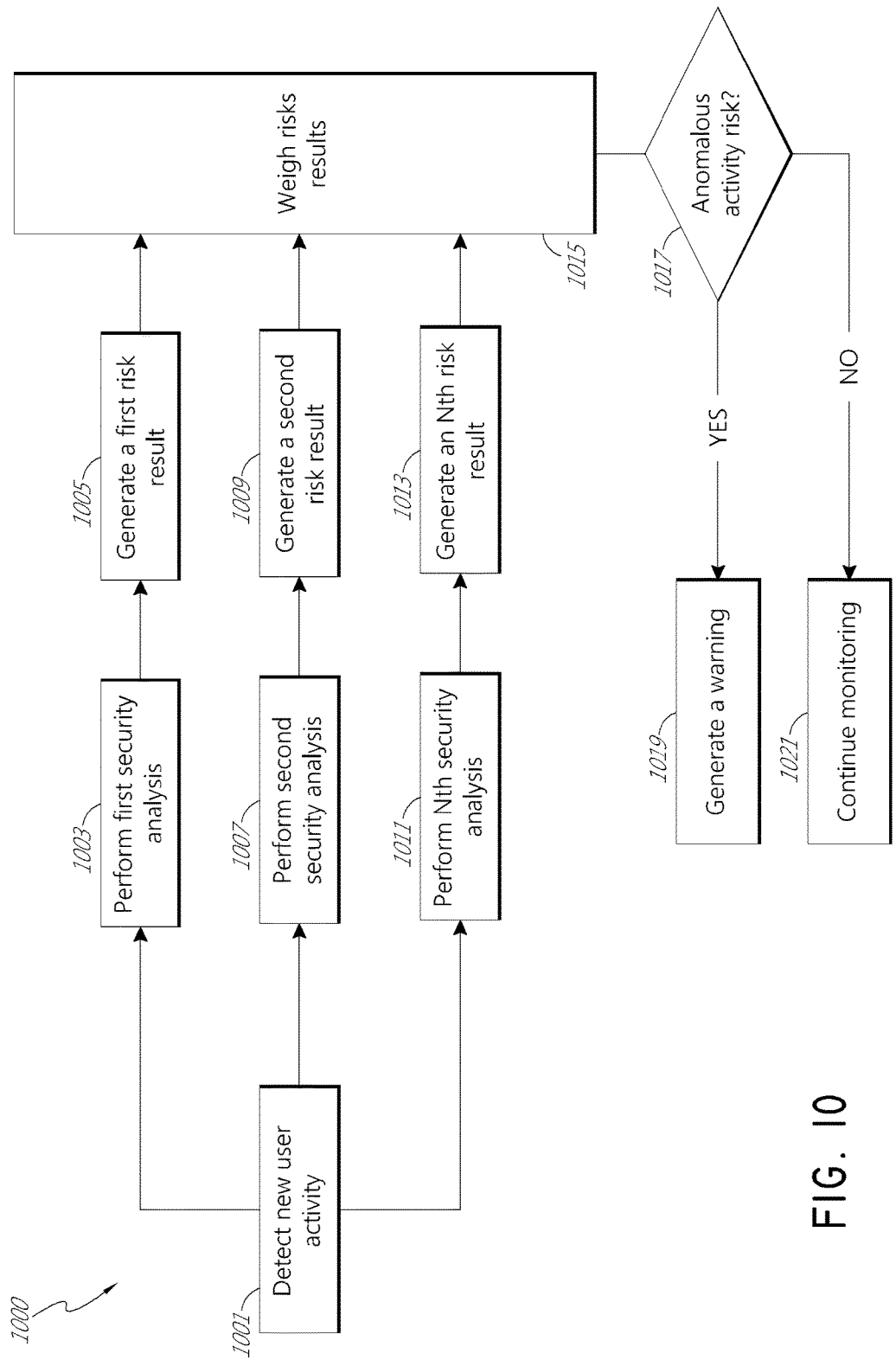
FIG. 10 shows a block diagram of an example method for detecting and warning of anomalous network activity according to one embodiment.

FIG. 10 shows a block diagram of an example method 1000 for detecting and warning of anomalous network activity according to one embodiment. At block 1001, new user activity is detected. At block 1003, a first security analysis is performed, and a first risk result is generated at block 1005. At block 1007, a second security analysis is performed, and a second risk result is generated at block 1009. At block 1011, an Nth security analysis can be performed in parallel, and an Nth risk result can be generated at block 1013.

The first, second, and Nth security analysis can include, for example, anomaly detection techniques disclosed in this application. These can include for example, comparing new user activity to activity of a cohort; comparing new user activity to activity of some other group; comparing new user activity to previous network activity performed by all users; comparing new user activity to previous user behavior; determining a probability of an attack based on the origin of user activity; identifying anomalous characteristics such as an anomalous amount of data being transferred or at an anomalous time or from an anomalous source; previous or recent activity flagged as anomalous by this or other users; etc. In one example, a first security analysis analyzes the new activity in light of the user's previous activity, a second security analysis analyzes the new activity in light of the cohort's activity, and a third security analysis analyzes the origin of the user activity.

At block 1015, the risk results can be weighed. This can include determining a risk score according using the equation:

$$S+W_2R_2+\ldots+W_NR_N$$

The risk score S is equal to the sum of a weighting factor $W_1$ times the first risk factor $R_1$ plus a weighting factor $W_2$ times the second risk factor $R_2$ and so on until adding the Nth weighting factor multiplied by the Nth risk result.

At block 1017, it can be determined, based at least in part on the risk score, whether or not there is likely anomalous activity. If it is determined that the activity is anomalous, then at block 1019, a warning can be generated. In some embodiments, the warning can be an internal flag of anomalous activity, and notifications and security measures will not be taken until a threshold number of internal flags have been raised in a given time period. In other embodiments, a warning is sent to administrators and the system automatically takes measures to prevent unauthorized network access, such as disabling a user account. If it is instead determined that the user activity is not anomalous, then the system can continue to monitor for new activity at block 1021.

Example General Method

Figure 11:
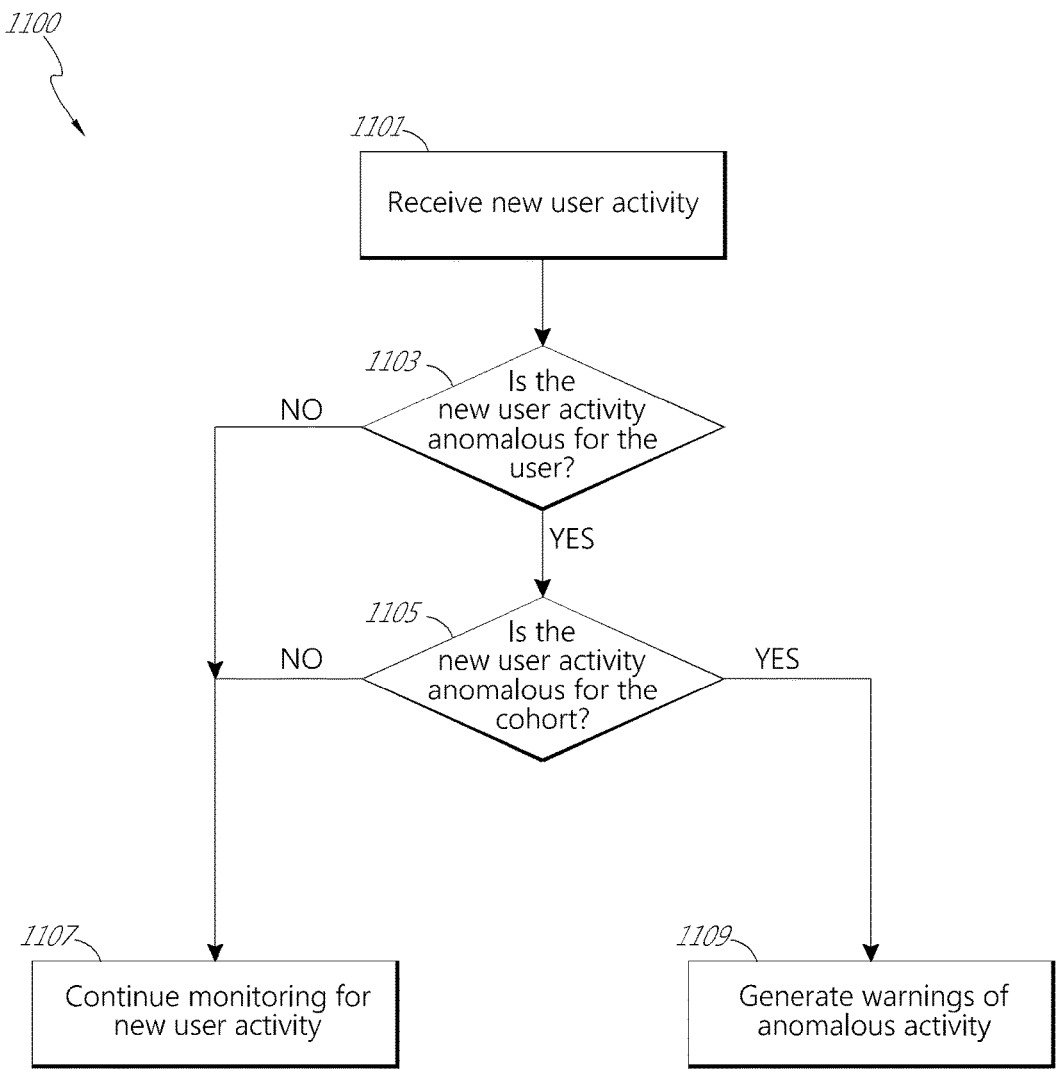
FIG. 11 shows a block diagram of an example method for detecting and warning of anomalous network activity according to one embodiment.

FIG. 11 shows a block diagram of an example method 1100 for detecting and warning of anomalous network activity according to one embodiment. The method 1100 shows an example of using cascading security analysis. At block 1101, new user activity is detected. At block 1103, a first security analysis is performed to determine if the new user activity is anomalous for this user. This can be based on, for example, the user's previously logged history.

If it is determined that the activity is not anomalous for the user based on the user's previous history, then at block 1107 the system can continue to monitor for new user activity.

If it is determined that the activity is anomalous for the user, this does not automatically trigger a warning at block 1109. Instead, at block 1105, it can be determined whether or not the new user activity is anomalous for any of the cohorts that the user belongs to.

If the new user activity, although anomalous for the user, is nonetheless normal for users of the cohort, then at block 1107 the system can continue to monitor for new user activity.

If the new user activity is anomalous for both the user and for the cohort, then at block 1109, the system can generate a warning of anomalous user activity.

Although the example method 1100 shows a specific analysis being performed, it can be generalized to include other types of analysis and additional analysis steps. In some embodiments, the methods can be performed in series or parallel with each other. In some embodiments, certain security analysis can directly generate flags or warnings of anomalous behavior even if other types of analysis do not generate warnings of anomalous behavior.

The disclosed methods discuss a variety of potential responses to detecting an anomaly. The methods can use a variety of responses when an anomaly is detected. Conclusive anomaly detection can cause immediate security measures such as revoking access to the network and warning administrators. Likely but inconclusive detection can result in less drastic measures such as limiting access to a lesser degree, raising internal flags, increasing network security, sending warnings, etc. In some embodiments, an initial anomaly detection will cause a user to be flagged as anomalous, and only after a certain number of flags is reached within a period of time will additional action be taken.

The disclosure also discusses logged activity. Where the context allows, logged activity can include all logged activity or logged activity for a selected period of time, such as the past 30 days. For example, when analyzing a new user activity against logged activity of the user, the logged activity of the user can be recent activity within the past year, excluding the new user activity.

The disclosure also discusses new user activity on a network. Where the context allows, this includes newly attempted user activity, newly performed user activity, and new activity being performed.

According to one embodiment, the techniques described herein are implemented by one or more special-purpose computing devices. The special-purpose computing devices can be hard-wired to perform the techniques, or can include digital electronic devices such as one or more application-specific integrated circuits (ASICs) or field programmable gate arrays (FPGAs) that are persistently programmed to perform the techniques, or can include one or more general purpose hardware processors programmed to perform the techniques pursuant to program instructions in firmware, memory, other storage, or a combination. Such special-purpose computing devices can also combine custom hard-wired logic, ASICs, or FPGAs with custom programming to accomplish the techniques. The special-purpose computing devices can be desktop computer systems, server computer systems, portable computer systems, handheld devices, networking devices or any other device or combination of devices that incorporate hard-wired and/or program logic to implement the techniques.

Computing device(s) are generally controlled and coordinated by operating system software, such as iOS, Android, Chrome OS, Windows XP, Windows Vista, Windows 7, Windows 8, Windows Server, Windows CE, Unix, Linux, SunOS, Solaris, Blackberry OS, VxWorks, or other compatible operating systems. In other embodiments, the computing device can be controlled by a proprietary operating system. Conventional operating systems control and schedule computer processes for execution, perform memory management, provide file system, networking, I/O services, and provide a user interface functionality, such as a graphical user interface (GUI), among other things.

Computer System

Figure 12:
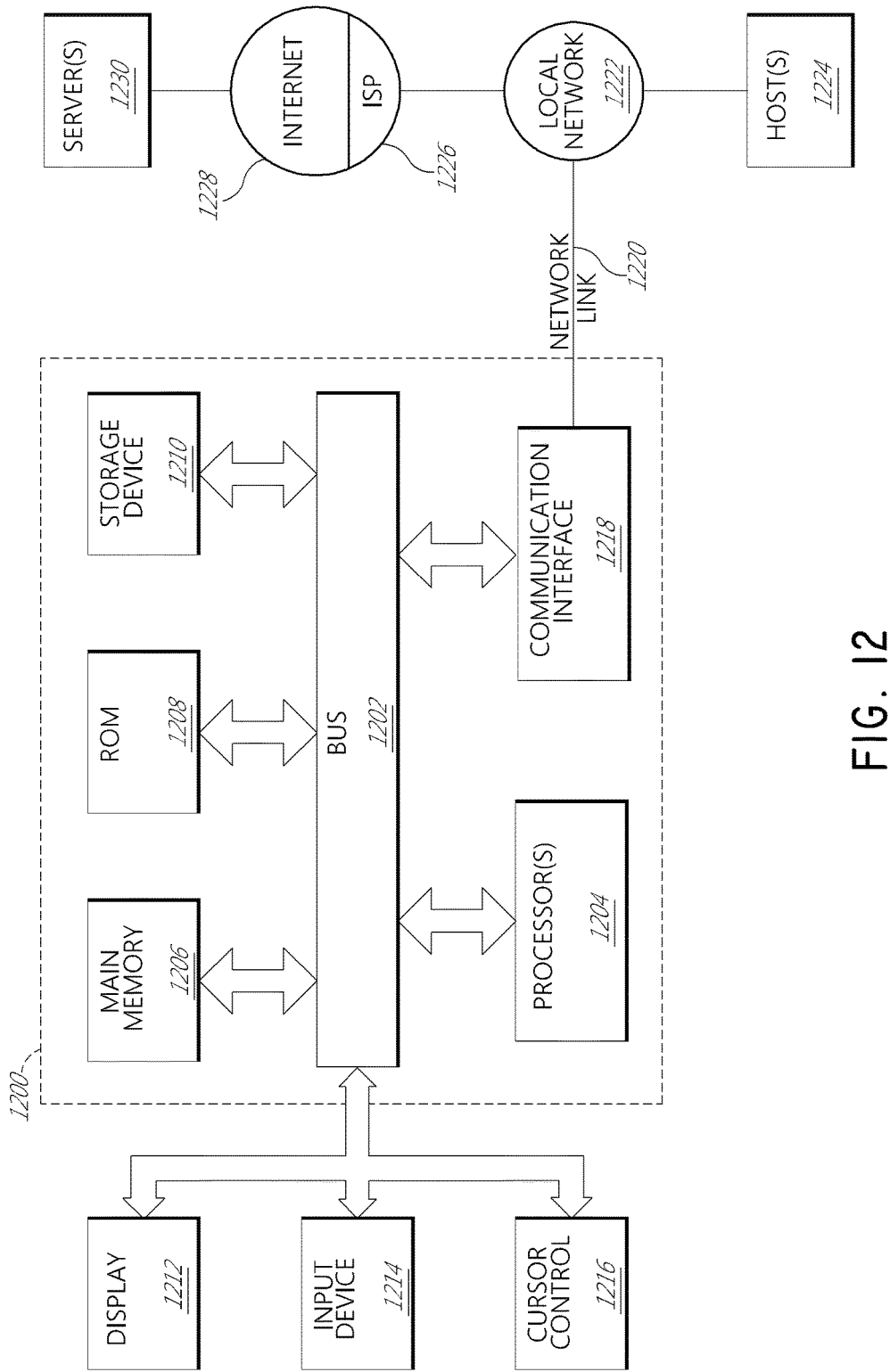
FIG. 12 shows a block diagram that illustrates a computer system upon which an embodiment can be implemented.

For example, FIG. 12 is a block diagram that illustrates a computer system 1200 upon which an embodiment can be implemented. For example, any of the computing devices discussed herein, such user device 103, administrator computer 115, the anomaly detection system, analysis engine 111, and/or the warning generator 113 can include some or all of the components and/or functionality of the computer system 1200.

Computer system 1200 includes a bus 1202 or other communication mechanism for communicating information, and a hardware processor, or multiple processors, 1204 coupled with bus 1202 for processing information. Hardware processor(s) 1204 can be, for example, one or more general purpose microprocessors.

Computer system 1200 also includes a main memory 1206, such as a random access memory (RAM), cache and/or other dynamic storage devices, coupled to bus 1202 for storing information and instructions to be executed by processor 1204. Main memory 1206 also can be used for storing temporary variables or other intermediate information during execution of instructions to be executed by processor 1204. Such instructions, when stored in storage media accessible to processor 1204, render computer system 1200 into a special-purpose machine that is customized to perform the operations specified in the instructions.

Computer system 1200 further includes a read only memory (ROM) 1208 or other static storage device coupled to bus 1202 for storing static information and instructions for processor 1204. A storage device 1210, such as a magnetic disk, optical disk, or USB thumb drive (Flash drive), and so forth, is provided and coupled to bus 1202 for storing information and instructions.

Computer system 1200 can be coupled via bus 1202 to a display 1212, such as a cathode ray tube (CRT) or LCD display (or touch screen), for displaying information to a computer user. An input device 1214, including alphanumeric and other keys, is coupled to bus 1202 for communicating information and command selections to processor 1204. Another type of user input device is cursor control 1216, such as a mouse, a trackball, or cursor direction keys for communicating direction information and command selections to processor 1204 and for controlling cursor movement on display 1212. This input device typically has two degrees of freedom in two axes, a first axis (for example, x) and a second axis (for example, y), that allows the device to specify positions in a plane. In some embodiments, the same direction information and command selections as cursor control can be implemented via receiving touches on a touch screen without a cursor.

Computing system 1200 can include a user interface module to implement a GUI that can be stored in a mass storage device as executable software codes that are executed by the computing device(s). This and other modules can include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "module," as used herein, refers to logic embodied in hardware or firmware, or to a collection of software instructions, possibly having entry and exit points, written in a programming language, such as, for example, Java, Lua, C or C++. A software module can be compiled and linked into an executable program, installed in a dynamic link library, or can be written in an interpreted programming language such as, for example, BASIC, Perl, or Python. It will be appreciated that software modules can be callable from other modules or from themselves, and/or can be invoked in response to detected events or interrupts. Software modules configured for execution on computing devices can be provided on a computer readable medium, such as a compact disc, digital video disc, flash drive, magnetic disc, or any other tangible medium, or as a digital download (and can be originally stored in a compressed or installable format that requires installation, decompression, or decryption prior to execution). Such software code can be stored, partially or fully, on a memory device of the executing computing device, for execution by the computing device. Software instructions can be embedded in firmware, such as an EPROM. It will be further appreciated that hardware modules can be comprised of connected logic units, such as gates and flip-flops, and/or can be comprised of programmable units, such as programmable gate arrays or processors. The modules or computing device functionality described herein are preferably implemented as software modules, but can be represented in hardware or firmware. Generally, the modules described herein refer to logical modules that can be combined with other modules or divided into sub-modules despite their physical organization or storage Computer system 1200 can implement the techniques described herein using customized hard-wired logic, one or more ASICs or FPGAs, firmware and/or program logic which in combination with the computer system causes or programs computer system 1200 to be a special-purpose machine. According to one embodiment, the techniques herein are performed by computer system 1200 in response to processor(s) 1204 executing one or more sequences of one or more instructions included in main memory 1206. Such instructions can be read into main memory 1206 from another storage medium, such as storage device 1210. Execution of the sequences of instructions included in main memory 1206 causes processor(s) 1204 to perform the process steps described herein. In alternative embodiments, hard-wired circuitry can be used in place of or in combination with software instructions.

The term "non-transitory media," and similar terms, as used herein refers to any media that store data and/or instructions that cause a machine to operate in a specific fashion. Such non-transitory media can comprise non-volatile media and/or volatile media. Non-volatile media includes, for example, optical or magnetic disks, such as storage device 1210. Volatile media includes dynamic memory, such as main memory 1206. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but can be used in conjunction with transmission media. Transmission media participates in transferring information between non-transitory media. For example, transmission media includes coaxial cables, copper wire and fiber optics, including the wires that comprise bus 1202. Transmission media can also take the form of acoustic or light waves, such as those generated during radio-wave and infra-red data communications.

Various forms of media can be involved in carrying one or more sequences of one or more instructions to processor 1204 for execution. For example, the instructions can initially be carried on a magnetic disk or solid state drive of a remote computer. The remote computer can load the instructions into its dynamic memory and send the instructions over a telephone line using a modem. A modem local to computer system 1200 can receive the data on the telephone line and use an infra-red transmitter to convert the data to an infra-red signal. An infra-red detector can receive the data carried in the infra-red signal and appropriate circuitry can place the data on bus 1202. Bus 1202 carries the data to main memory 1206, from which processor 1204 retrieves and executes the instructions. The instructions received by main memory 1206 can retrieve and execute the instructions. The instructions received by main memory 1206 can optionally be stored on storage device 1210 either before or after execution by processor 1204.

Computer system 1200 also includes a communication interface 1218 coupled to bus 1202. Communication interface 1218 provides a two-way data communication coupling to a network link 1220 that is connected to a local network 1222. For example, communication interface 1218 can be an integrated services digital network (ISDN) card, cable modem, satellite modem, or a modem to provide a data communication connection to a corresponding type of telephone line. As another example, communication interface 1218 can be a local area network (LAN) card to provide a data communication connection to a compatible LAN (or WAN component to communicate with a WAN). Wireless links can also be implemented. In any such implementation, communication interface 1218 sends and receives electrical, electromagnetic or optical signals that carry digital data streams representing various types of information.

Network link 1220 typically provides data communication through one or more networks to other data devices. For example, network link 1220 can provide a connection through local network 1222 to a host computer 1224 or to data equipment operated by an Internet Service Provider (ISP) 1226. ISP 1226 in turn provides data communication services through the world wide packet data communication network now commonly referred to as the "Internet" 1228. Local network 1222 and Internet 1228 both use electrical, electromagnetic or optical signals that carry digital data streams. The signals through the various networks and the signals on network link 1220 and through communication interface 1218, which carry the digital data to and from computer system 1200, are example forms of transmission media.

Computer system 1200 can send messages and receive data, including program code, through the network(s), network link 1220 and communication interface 1218. In the Internet example, a server 1230 might transmit a requested code for an application program through Internet 1228, ISP 1226, local network 1222 and communication interface 1218.

The received code can be executed by processor 1204 as it is received, and/or stored in storage device 1210, or other non-volatile storage for later execution.

To provide a framework for the above discussion of the specific systems and methods described herein, an example system will now be described. This description is provided for the purpose of providing an example and is not intended to limit the disclosure.

Each of the processes, methods, and algorithms described in the preceding sections can be embodied in, and fully or partially automated by, code modules executed by one or more computer systems or computer processors comprising computer hardware. The processes and algorithms can be implemented partially or wholly in application-specific circuitry.

Figure 13:
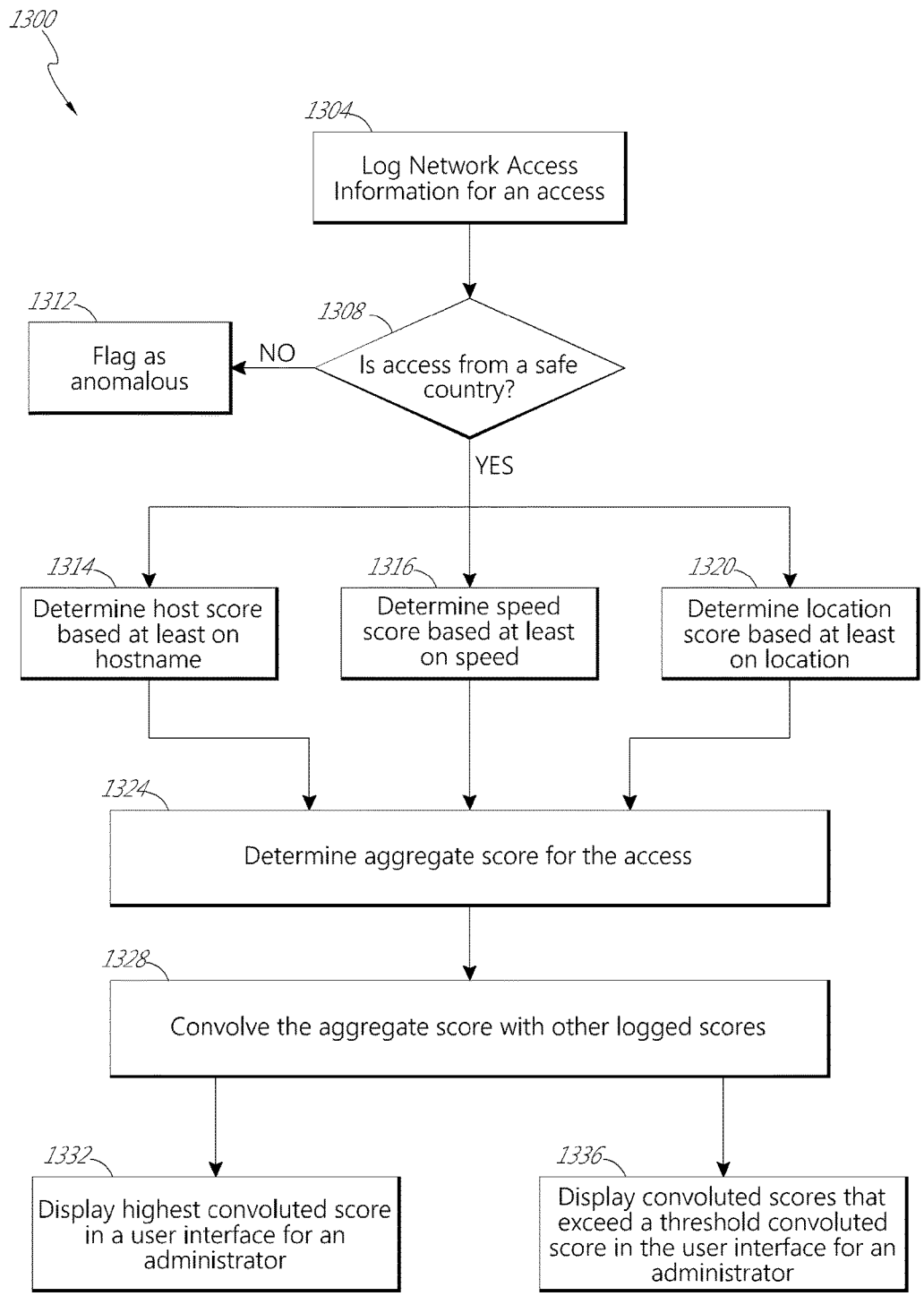
FIG. 13 shows a block diagram of an example method for detecting and warning of anomalous network activity according to one embodiment.

FIG. 13 shows a block diagram of an example method 1300 for detecting and warning of anomalous network activity according to one embodiment. At block 1304, network access information is logged. This network access information can include, for example, a timestamp, IP address, username, and hostname used to access a VPN. The network access information can be used to determine additional information, such as if a new hostname is being used, the country that the user is accessing the network from, the city that the user is accessing the network from, the longitude and latitude that the user is accessing the network from, and a minimum travel speed.

At block 1308, a rule can be used to determine if the user is accessing the network from a safe country. This can be a whitelist of countries, such as NATO countries, or based on a blacklist. For some networks, a custom or dynamic list can be used. If the network access is determined to be from an unsafe location, such as from a blacklisted country, then an anomaly can be flagged at block 1312. In some embodiments, an access from an unsafe country can affect a score indicative of the likelihood of an anomaly.

Upon determining that the network access is from a safe or trusted location, at block 1314 a host score can be determined based at least on the hostname used to access the network. The host score can reflect the likelihood anomalous user activity given an access from a new hostname.

Upon determining that the network access is from a safe or trusted location, at block 1316 a speed score can be determined based at least on a minimum theoretical speed of the user based on location and timestamps of consecutive network accesses from the same user.

Upon determining that the network access is from a safe or trusted location, at block 1320 a location score can be determined based at least on the location from which the network is being accessed. Even within the list of safe access locations, accesses from some locations can be more suspicious than others. For example, for a network in New York with all of its users in New York, an access from New York can have a score of zero, an access from a different state such as California can have a score such as 10, and an access from the United Kingdom can have a score of 50.

At block 1324, an aggregate score for the network access can be determined. The aggregate score can be a weighted score based on at least two of the hostname score, the speed score, and the location score.

At block 1328, the aggregate score can be convoluted with other logged scores for the user to determine a convoluted score. The convolution can be with an impulse, pulse, triangle, curve, or other function. The convolution can be performed for a certain period of time or a certain number of log entries.

At block 1332, the highest convoluted score can be displayed in a user interface for an administrator. In some embodiments, an aggregate score can be displayed in the user interface.

At block 1336, the convoluted scores that exceed a threshold convoluted score can be displayed in a user interface for the administrator. In some embodiments, an aggregate score exceeding an aggregate threshold can be displayed in the user interface.

Figure 14:
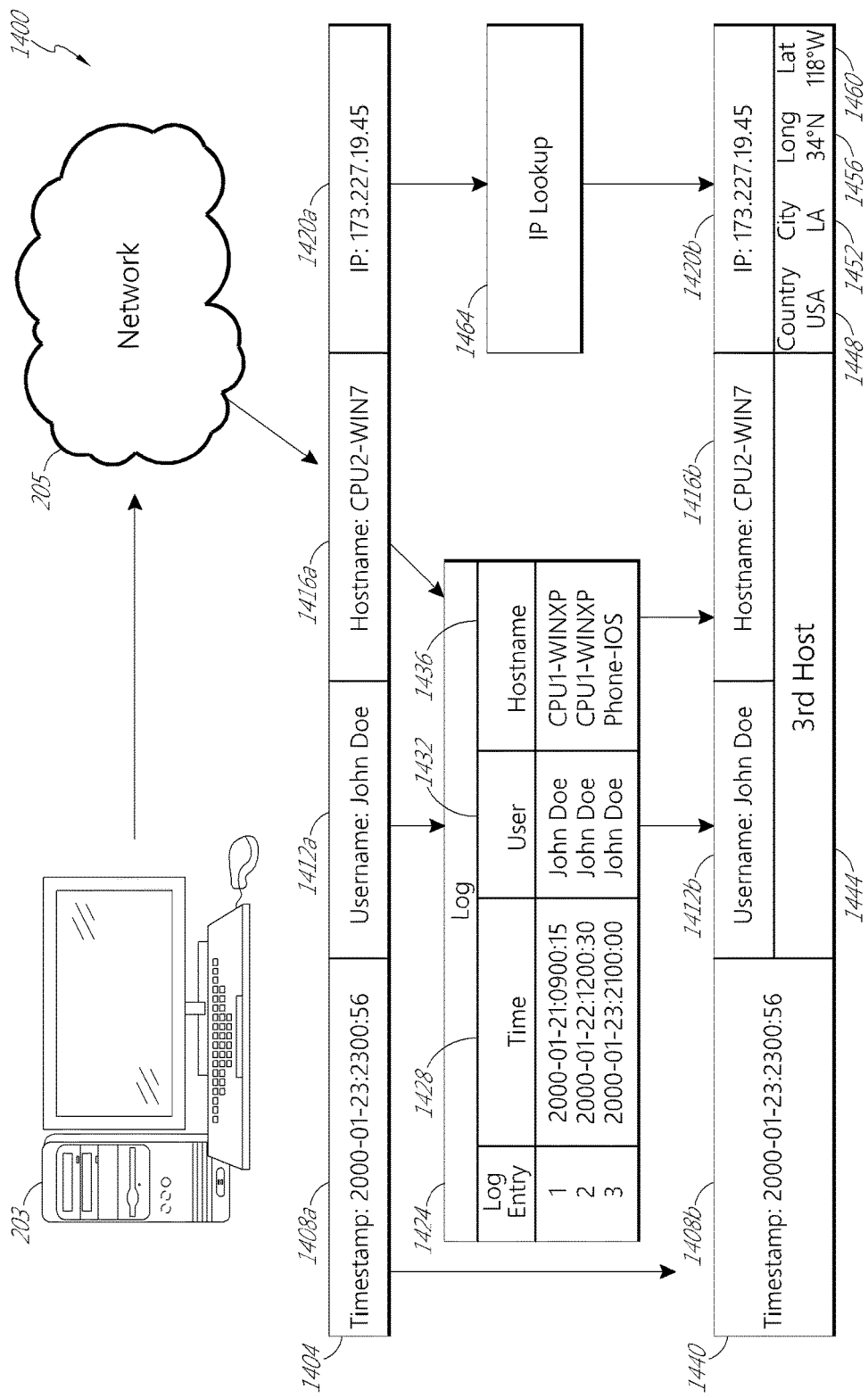
FIG. 14 shows an example of data gathered during a network access according to one embodiment.

FIG. 14 shows an example of data gathered during a network access according to one embodiment 1400. A user 203 accesses a network 205. An access log entry 1404 can have a timestamp 1408a, username 1412a, hostname 1416a, and IP address 1420a. A log table 1424 has a timestamp history 1428 of the same user's 1432 hostnames 1436. An expanded log can 1440 can include a timestamp 1408b, username 1412b, hostname 1416b, and whether this is the first time that an Nth host 1444 is accessed. An IP lookup system 1464 can be used to determine the country 1448, city 1542, longitude 1456, and latitude 1460 of an IP address.

In the embodiment shown, when the network 205 is accessed from user 203, a log entry 1404 is generated to include the timestamp 1408a of the network access event.

The username 1412a is "John Doe." John Doe can access the network 205 by presenting the proper credentials (e.g., password). The network 205 is accessed from a computing device 203 that has a hostname "CPU2-WIN7," 1416a, which is logged in the entry 1404. The IP address 1420a that John Doe uses to access the network 205 is also logged.

The username 1412a and hostname 1416a can be matched against other log entries 1424 in the same or a different log. In the other log entries 1424, the user John Doe 1432 is identified, and the corresponding hostnames 1436 that John Doe used to access the network from can be obtained. In the entries 1424, John Doe has previously accessed the network from a device hostname "CPU1-WINXP" and "Phone-IOS," the devices respectively being his work computer and cellphone. The history of past log entries 1424 does not contain "CPU2-WIN7," so this new hostname would be the third unique hostname 1444, which can be logged in the expanded log entry 1440. In some embodiments, the expanded log entry 1440 can be the same as log entry 1404, but with more data added, and in some embodiments, the expanded log entry can be a different log.

The IP address 1420a can be input into an IP lookup system 1464 to determine the country 1448, city 1452, longitude 1456, and latitude 1460 of the IP address. In the embodiment, the user's IP address 1420a is traced to the USA in the city of Los Angeles, located at 34°N, 118°W. The IP address 1420b, country 1448, city 1452, longitude 1456, and latitude 1460 are logged into the expanded log entry 1440.

Figure 15A:
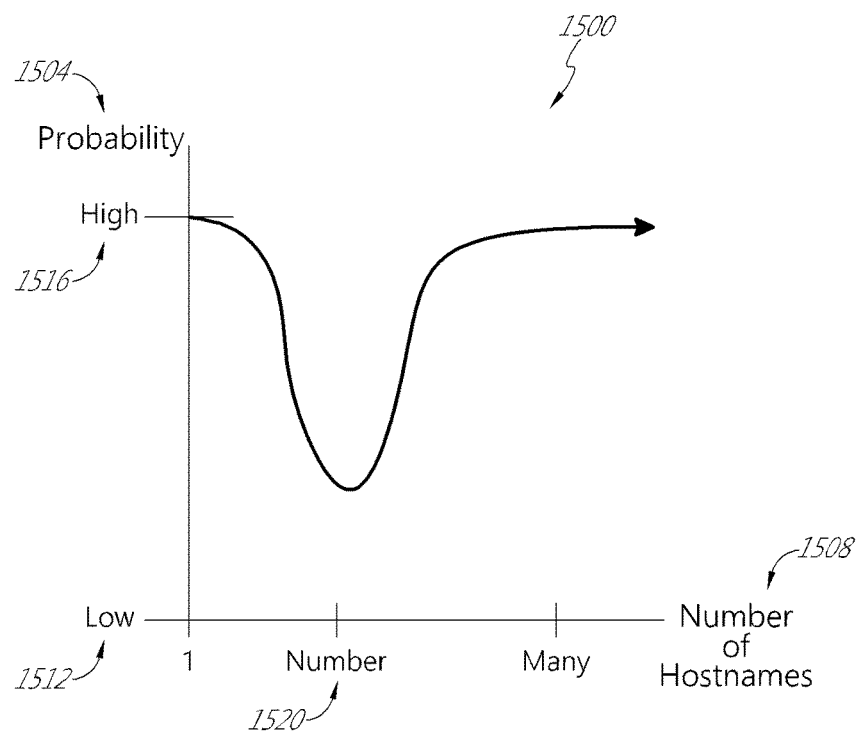
FIG. 15A shows an example graph of the probability of a non-malicious user accessing a network through an Nth hostname for the first time.

FIG. 15A shows an example graph 1500 of the probability of a non-malicious user accessing a network through an Nth hostname for the first time. The Y-axis 1504 represents the probability that an access to the network from an Nth machine for the first time is a non-malicious user. The probability ranges from low 1512 to high 1516. The actual numbers for low and high can vary for different networks. The X-axis 1508 represents the number of unique hostnames for different machines that a user accesses the network from for the first time.

The graph can reflect a reality that is counter to intuition and expectations. It can be expected that a single user has a limited number of computers, and so the single user will not access the same network through a large number of devices. Along the same line of reasoning, if a user accesses a network from many different devices (e.g., 3, 5, 10, 20, 50, 100 or more), then the accesses from the different machines must in fact be from different people at different machines who have compromised the username and password.

However, as the graph shows, this expectation does not conform to results. As the graph shows, a user typically accesses a network through a small number of devices with different hostnames. For example, a user might have a work computer, a laptop at home, and a smartphone to access the network—a total of three devices. The probability of a network access being from the non-malicious user decreases until a number 1520 of hostnames have been used to access the network for the reasoning described above. However, past that number 1520 of hostnames, the probability of a non-malicious user accessing the network from new hostnames begins to become high again.

This is because, for many networks, the administrators, technical support personnel, and other specialized network users need to log into the network from a large number of machines. If a certain user has previously accessed the network from a large number of machines with different hostnames and then accesses the network again from a new hostname, it is more likely that the new access is non-malicious actor (such as an IT guy who sets up everyone's computer now setting up a new employee's computer) instead of being from a malicious actor.

As a result, the anomaly detection system can assign a higher probability score of a non-malicious actor for a first network access from a unique Nth hostname (e.g., at a $5^{th}$, $10^{th}$, $20^{th}$, $50^{th}$, $100^{th}$ or higher) than it did for a first network access from a number 1520 of hostnames that is lower than the Nth hostname. It can also assign a higher probability score of a non-malicious actor for a first network access from a low number unique hostnames (e.g., at a $1^{st}$, $2^{nd}$, $3^{rd}$, $5^{th}$) than it does for when the network is accessed from a number 1520 of unique hostnames that is higher than the low number of unique hostnames. The number 1520 can vary. In some embodiments, the number 1520 ranges from 3 to 15.

Figure 15B:
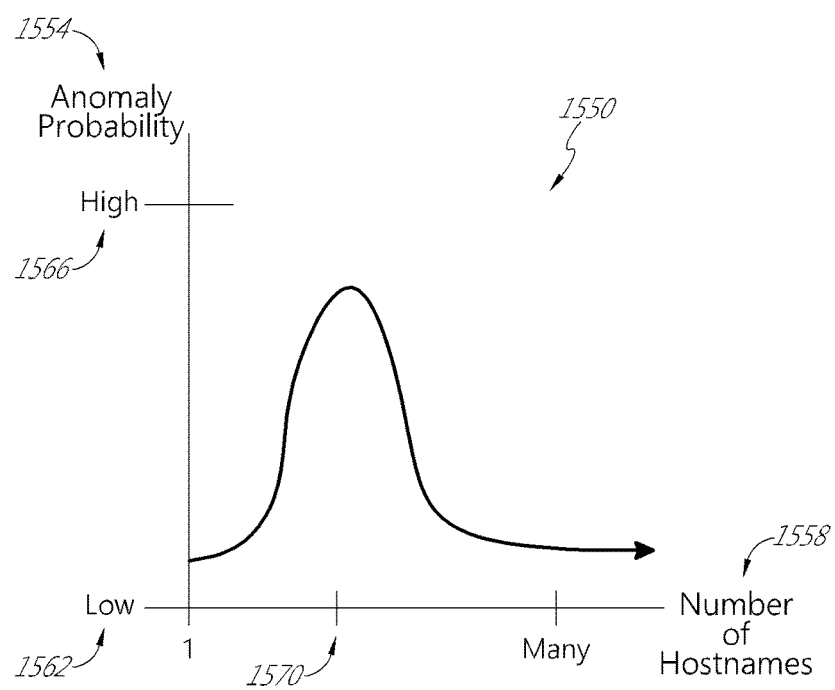
FIG. 15B shows an example graph of the probability of anomalous user activity based on a user's network activity from an Nth hostname for the first time.

FIG. 15B shows an example graph 1550 of the probability of a malicious user accessing a network through an Nth hostname. The Y-axis 1554 represents the probability that an access to the network from an Nth machine is a malicious user. The probability ranges from low 1562 to high 1566. The actual numbers for low and high can vary for different networks. The X-axis 1558 represents the number of unique hostnames for different machines that a user accesses the network from.

The graph 1550 shows that a single user accessing the network from a few different hostnames is not likely to be a malicious actor. However, the probability of an access to the network from a new hostname increases until a number 1570 of unique hostnames have been used to access the network. Then, further accesses to the network from additional unique hostnames are not as likely to be malicious actors.

The graphs 1500 and 1550 can vary with time and user. For example, after a new user is authorized to a network, there is an initial setup period where the user can use a multitude of devices with different usernames to access the network for the first time. It would not be anomalous during this time period for the user to use 3, 5, or 10 different devices. However, a longtime user with an established history of using N devices can cause suspicion when the N+1th device is used to access the network. In effect, for a time range, the network anomaly detestation systems can normalize a user's number of devices, raise flags or increase an anomaly score when the next few (e.g., the next 1, 2, 3, 4, 5) hostnames are used by that user to access the network, and not raise flags or use lower anomaly scores when a high number of hostnames are used to access the network.

Figure 16A:
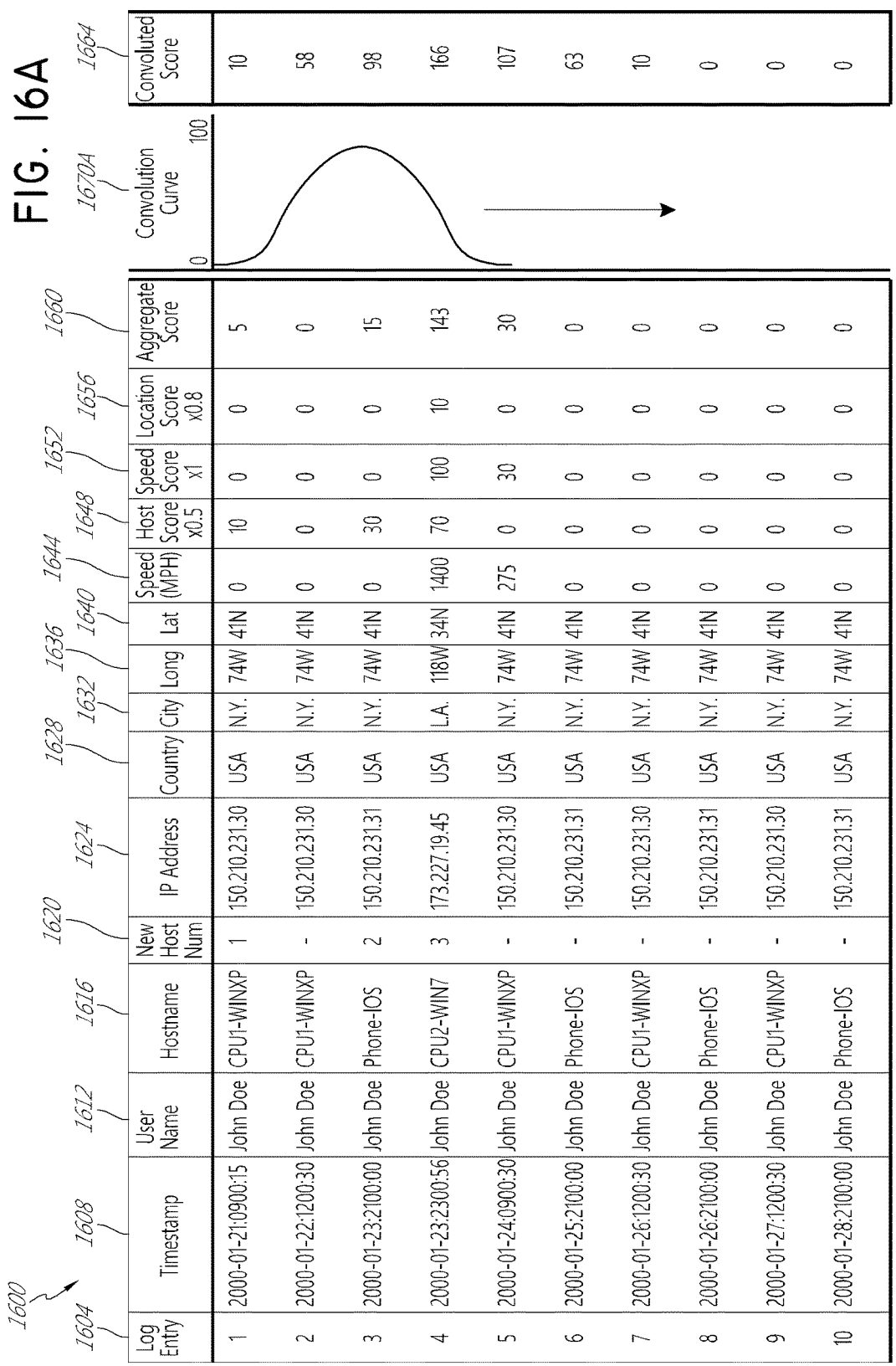
FIG. 16A shows an example data table according to one embodiment.

FIG. 16A shows an example data table 1600 according to one embodiment continuing from the example embodiment in FIG. 14. The data table includes a log entries 1604 of timestamps 1608, usernames 1612, hostnames 1616, new host numbers 1620, IP addresses 1624, country 1628, city 1632, longitude 1636, and latitude 1640 that a network was accessed from. Based on the logged data, a speed 1644, weighted host score 1648, weighted speed score 1652, weighted location score 1656, aggregate score 1660, and convoluted score 1664 can be determined.

The data table shows entries for the username John Doe, with the new log from FIG. 14 at log entry number 4. The first log entry shows that at the timestamp of Jan. 21, 2000, John Doe used his machine with hostname CPU1-WINXP to access the network for the first time at an IP address originating from New York. Because he is accessing the network from a computer with a new hostname for the first time, a host score of 10 is assigned and weighted by 0.5× to generate an aggregate score of 5. The second log entry shows that at the timestamp of Jan. 22, 2000, John Doe again accessed the network similarly. This time, there is no host score because he did not use a machine with a new hostname.

Log entry 3 shows that on January 23, at 9 PM, John Doe used his cellphone with hostname Phone-IOS to access the network from an IP address originating in New York. This is John Doe's second new hostname, so a host score of 30 is assigned, which is weighted by 0.5× to generate an aggregate score of 15.

Log entry 4 shows that on January 23 at 11 PM, John Doe used a new computer with hostname CPU2-WIN7 to access the network from an IP address originating in Los Angeles. Using the longitude and latitude information, it can be determined that in traveling from New York to Los Angeles in two hours requires flying at about 1,400 miles per hour, about MACH-2 or twice the speed of sound. First, because a $3^{rd}$ new hostname is used, a high host score of 70 is assigned. Next, because of the highly unlikely speed that John Doe would have needed to travel, a speed score of 100 is assigned. Finally, because the location is not from John Doe's ordinary New York location, but still within a popular domestic American city, a low location score of 10 is assigned. The host score is weighted by 0.5×, the speed score is weighted by 1×, and the location score is weighted by 0.8×. The scores are added to generate an aggregate score of 143, indicating a high chance of anomalous activity by a malicious user who compromised John Doe's network login credentials.

Log entry 5 shows that on January 24 at 9 AM, John Doe used his computer with hostname CPU1-WINXP to access the network from a IP address located in New York. No new hostname is used, so no host score is assigned. However, a small speed score of 30 is assigned because John Doe would need to have traveled back to New York at about 275 miles per hour, a reasonable speed for a commercial airliner. The resulting aggregate score is 30 after weighting the speed score with 1×.

Log entries 6-10 show John Doe using his CPU1-WINXP and Phone-IOS computers to access the network on subsequent days from New York, and no anomalous activity is detected.

In some embodiments, high aggregate scores can be flagged and reported to a network administrator, or other precautionary measures can be taken such as restricting or denying access to the network.

Figure 16B:
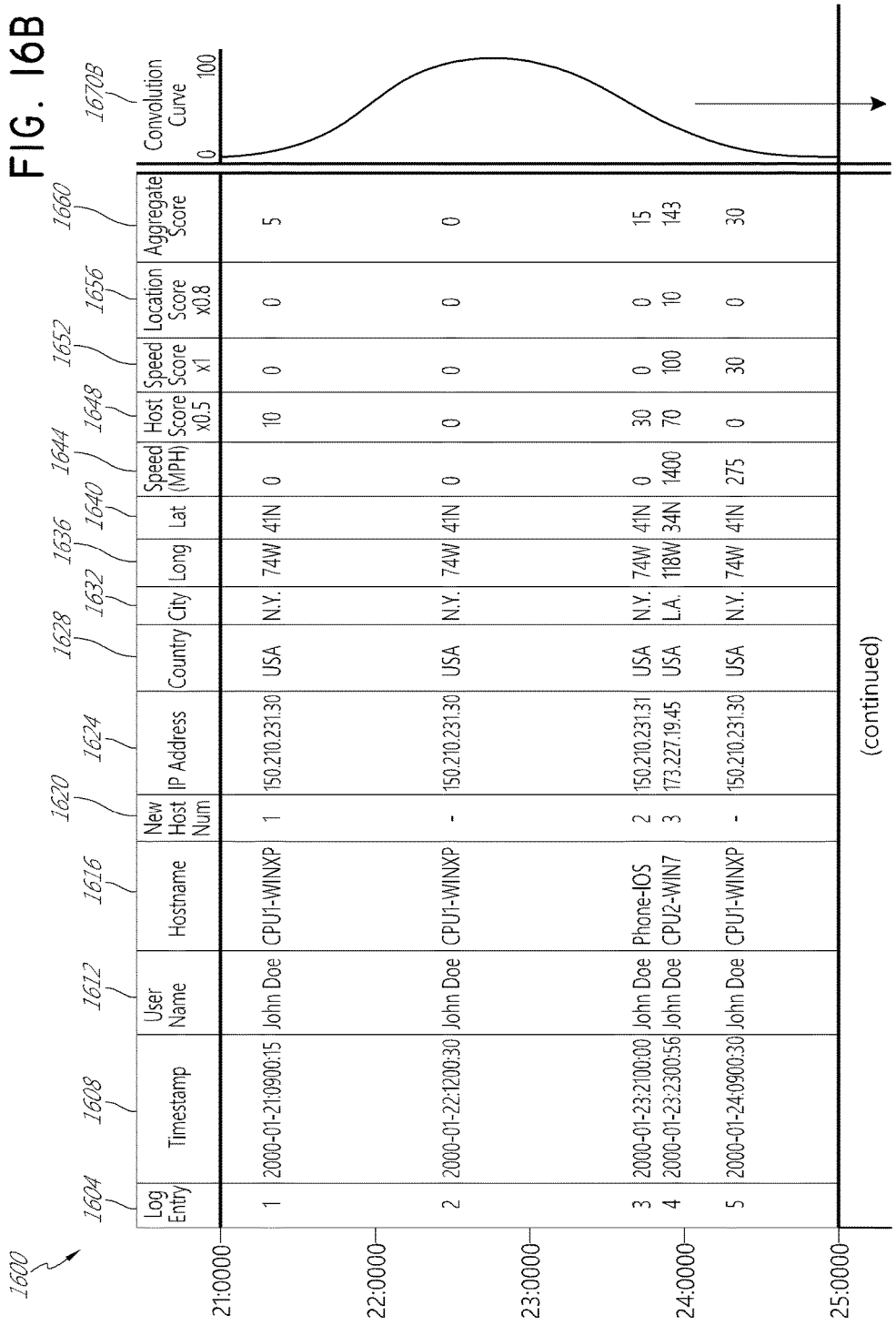
FIG. 16B shows an example data table according to one embodiment.

In some embodiments, convolution can be used to generate a convoluted score reflecting the anomalous probability given multiple log entries. The convolution score is the mathematical convolution of the aggregate scores with a function. The function can be illustrated as convolution curve 1670A, can be applied to multiple entries to generate the convoluted scores. The entries can be proximate in the data table within a number of lines or within a time range (e.g., same day, 24 hours, 48 hours). In the embodiment shown in FIG. 16A, the convolution curve shown in the embodiment spans over previous two entries and subsequent two entries for a given log entry. The embodiment shown in FIG. 16B depicts the subset of log entries 1-5 from FIG. 16A with visually emphasized spacing along a time axis to help visualize the application of a convolution curve 1670B to log entries over a time range. However some convolution curves can be larger or smaller, and can be, for example, a pulse, impulse, sawtooth, triangle, Gaussian, or other shape.

In some embodiments, the convoluted score can be used to detect anomalous network activity if it exceeds a threshold value. It can be reported to an administrator, or the network can automatically take actions such as restricting or denying access to the user.

In addition to using convolution to represent the anomalous potential of multiple log entries, other techniques can be used to give the appropriate weight to multiple log entries.

In one embodiment, a small score (e.g., 20) for an unsuccessful login attempt can be logged. By itself, the unsuccessful login attempt might not be high enough to be flagged as anomalous activity, as it may simply be a non-malicious user who mistyped a password. However, the small scores of 20 from repeated (for example, 5) unsuccessful login attempts within a time period can be added up to 100, a score that can be flagged as an anomaly.

Figure 17:
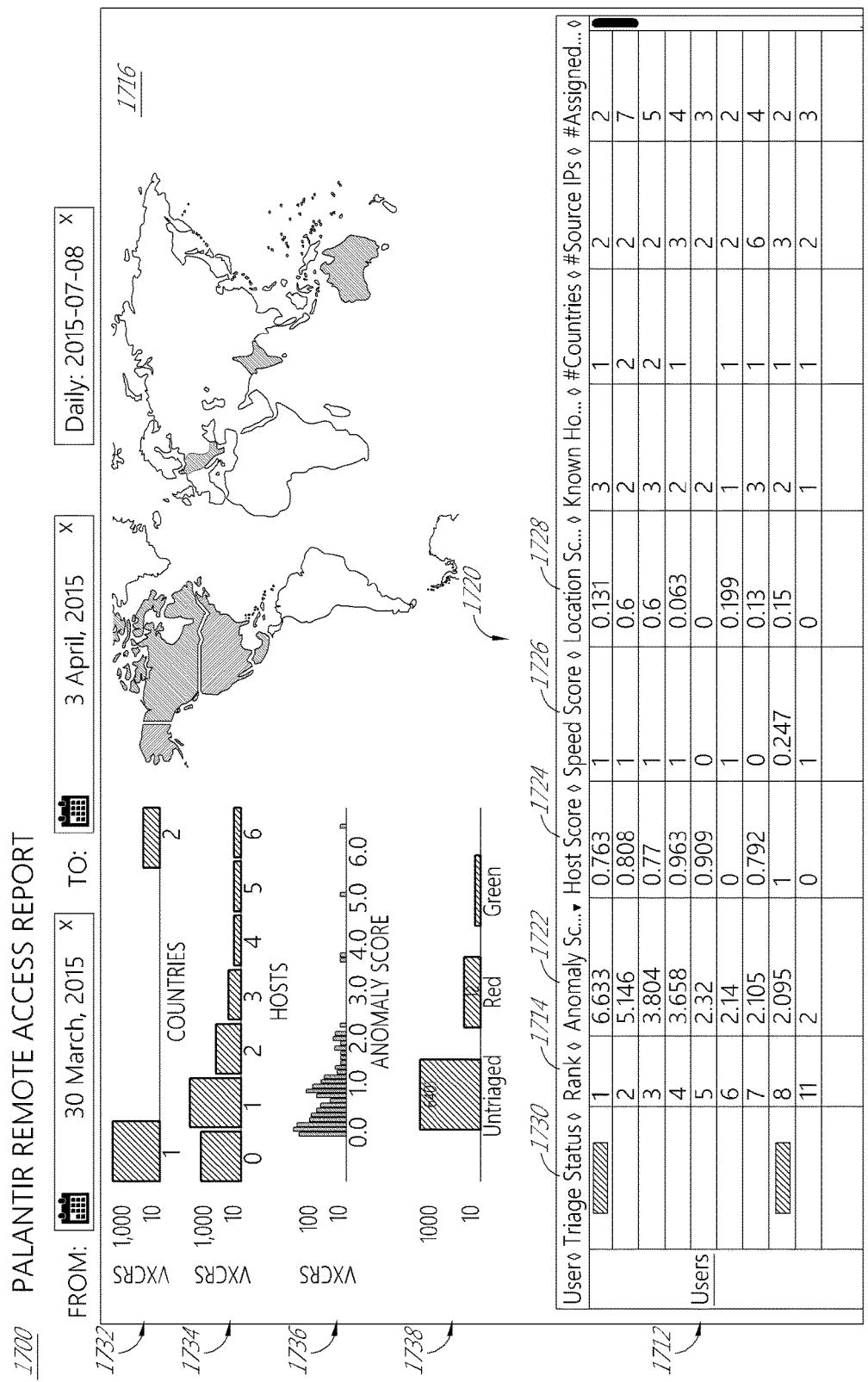
FIG. 17 shows an example user interface according to one embodiment.

FIG. 17 shows an example user interface 1700 according to one embodiment. The user interface 1700 includes identifications of user accounts 1712 (e.g., different usernames) that can access one or more network accessible systems of a business, and that are associated with a risk of being compromised (e.g., controlled by a malicious actor). Each user account includes an identification of user compromise scores 1720, with each score measuring a type of user behavior indicative of the user account being compromised. In some implementations, the user compromise scores can be between a range of numbers (e.g., between zero and one, between −100 and 100, between zero and 200), with a greater score indicating a greater risk of compromise. The user accounts 1712 are ordered according to a rank 1714 determined from a combination (e.g., a weighted combination) of the user compromise scores 1720. In some implementations, the rank can be based solely off the "Anomaly Score," which can be, for example, the convoluted score or the aggregate score.

As described above, the example user interface 10 includes user compromise scores associated with "Remote Access" 1, and includes user compromise scores measuring types of user behavior when user accounts, or network accessible systems, are initially accessed.

For instance, the "Host Score" 1722 for a particular user account is a measure associated with network accessible systems the particular user account accessed. The "Host Score" 1724 can be based off a number of network accessible systems an average user account accesses, and a number of systems the particular user account normally accesses. In addition to a number of network accessible systems, the "Host Score" 1724 can be greater if the particular user account has recently accessed network accessible systems not historically associated with the particular user account.

The "Speed Score" 1726 for a particular user account measures how likely it is that a single user has accessed the particular user account from disparate locations in a period of time. For instance, if the particular user account was accessed in a first remote session from a first location (e.g., New York), and a short period of time later (e.g., 15 minutes), accessed from a second location (e.g., Los Angeles), the "Speed Score" 1726 can indicate that one user could not travel fast enough between those two locations to effect the two remote sessions.

The "Location Score" 1728 for a particular user account measures risk associated with the locations from which the particular user account was accessed. For instance, a particular geographic region can be known (e.g., to a system administrator) to be associated with malicious activity. The "Location Score" 1728 can thus be greater if the particular user account is being accessed from the particular geographic region. Additionally, the "Location Score" 1728 can be greater if the particular user account is being accessed from geographic regions that the particular user account has not, or rarely, previously been accessed from.

The "Anomaly Score" 1722 for a particular account is a combination of the "Host Score" 1724, "Speed Score" 1726, and "Location Score" 1728. In some implementations, the "Anomaly Score" 1722 is a convolution of the weighted sum taken over time with a user selectable window size. In some embodiments, the "anomaly score" 1722 is the aggregate score.

The user interface 1700 further includes a map 1716 of the Earth, and countries which remote sessions (e.g., VPN sessions) to access user accounts have emanated from. In some implementations, the map 1716 can be a heat-map identifying a frequency of the access, and each country in the map 1716 can be selectable by a user. Upon selection of a country, the user interface 1710 can be updated to include user accounts that have been accessed from the selected country.

A user of the user interface 1710 can mark a particular user account according to a "Triage Status" 1730, which can include an identification of whether the particular user account needs further review, or has already been reviewed (e.g. the user can mark the particular user account according to a color code system such as red or green displayed in the graph 38). In this way, a different user can view the user interface 1710, and identify a user account to review according to the "Triage Status" 1730.

Additionally, the user interface 1730 includes summary data describing user accounts associated with the business. For instance, the summary data can include a graph identifying a number of countries 1732 that user accounts have been accessed from, a graph identifying a number of network accessible systems or "Hosts" 1734 that each user account has accessed, determined distribution of anomaly scores 1736, and a graph identifying a number of user accounts for each "Triage Status" 1738 identified by users of the user interface 1710.

Utilizing the user interface 1710, a user (e.g., a system administrator) can gain valuable insights into the user accounts associated with the business. The user can determine that a particular user account is need of further review, and can select the particular user account to view more detailed information.

Additional Discussion

The various features and processes described above can be used independently of one another, or can be combined in various ways. All possible combinations and sub-combinations are intended to fall within the scope of this disclosure. In addition, certain method or process blocks can be omitted in some implementations. The methods and processes described herein are also not limited to any particular sequence, and the blocks or states relating thereto can be performed in other sequences that are appropriate. For example, described blocks or states can be performed in an order other than that specifically disclosed, or multiple blocks or states can be combined in a single block or state. The example blocks or states can be performed in serial, in parallel, or in some other manner. Blocks or states can be added to or removed from the disclosed example embodiments. The example systems and components described herein can be configured differently than described. For example, elements can be added to, removed from, or rearranged compared to the disclosed example embodiments.

Conditional language, such as, among others, "can," "could," "might," or "can," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment. Where the context permits, words in the Detailed Description using the singular or plural number can also include the plural or singular number, respectively. The words "or" in reference to a list of two or more items, is intended to cover all of the following interpretations of the word: any of the items in the list, all of the items in the list, and any combination of the items in the list.

The term "comprising" as used herein should be given an inclusive rather than exclusive interpretation. For example, a general purpose computer comprising one or more processors should not be interpreted as excluding other computer components, and may possibly include such components as memory, input/output devices, and/or network interfaces, among others.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions can be deleted, executed out of order from that shown or discussed, including substantially concurrently or in reverse order, depending on the functionality involved, as would be understood by those skilled in the art. Furthermore, the embodiments illustratively disclosed herein may be suitably practiced in the absence of any element or aspect which is not specifically disclosed herein.

It should be emphasized that many variations and modifications can be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

What is claimed is:

1. A computer system comprising:
   one or more computer readable storage devices configured to store one or more software modules including computer executable instructions; and
   one or more hardware computer processors in communication with the one or more computer readable storage devices and configured to execute the computer executable instructions in order to cause the computer system to:

receive information indicative of an access to a network by a user, wherein the information comprises at least:
  an identity associated with the user;
  a hostname of a machine associated with the user;
  a time associated with the access to the network; and
  location information associated with the identity;
determine, based at least on the information, a host score indicative of a first likelihood that the user access to the network was malicious, wherein the host score is determined based, at least in part, on a number of unique machines associated with the user;
determine, based on the information, a speed score indicative of a second likelihood that the user access to the network was malicious, wherein the speed score is determined based, at least in part, on a calculated travel speed for the user;
determine, based on the information, a location score indicative of a third likelihood that the user access to the network was malicious, wherein the location score is determined based, at least in part, on attack origin distribution data; and
determine an aggregate score based at least in part on the host score, the speed score, and the location score.

2. The computer system of claim 1, wherein:
the location information comprises an internet protocol (IP) address; and
the one or more hardware computer processors are further configured to execute the computer executable instructions in order to cause the computer system to:
  perform an IP lookup to determine geographical coordinates associated with the IP address; and
  calculate the travel speed for the user to arrive at the geographical coordinates.

3. The computer system of claim 1, wherein:
the location information comprises an IP address; and
the one or more hardware computer processors are further configured to execute the computer executable instructions in order to cause the computer system to:
  perform an IP lookup to determine a country associated with the IP address; and
  determine the location score by multiplying a probability that the country is the source of an attack times a probability of an attack on the network and dividing by the probability of activity coming from the country.

4. The computer system of claim 1, wherein:
the host score indicates increasingly higher likelihoods of malicious activity for each additional unique machine associated with the identity in accessing the network until a threshold number of unique machines is logged;
the host score indicates a highest likelihood of malicious activity when the threshold number of unique machines is logged;
the host score indicates a likelihood of malicious activity that is lower than the highest likelihood of malicious activity when more than the threshold number of unique machines is logged; and
the host score indicates a low likelihood of malicious activity when the machine associated with an access the network by the user is also associated with a previous access the network by the user.

5. The computer system of claim 1, wherein the information is indicative of a plurality of accesses to the network by the user, and wherein the one or more hardware computer processors are further configured to execute the computer executable instructions in order to cause the computer system to:
  calculate a plurality of aggregate scores based, at least in part, on the information indicative of the plurality of accesses to the network;
  perform a mathematical convolution based, at least in part, on the aggregate score and the plurality of aggregate scores to determine a convoluted score.

6. The computer system of claim 1, wherein the one or more hardware computer processors are further configured to execute the computer executable instructions in order to cause the computer system to:
  sort the user into a cohort;
  determine the host score based, at least in part, on host machine usage by other members of the cohort; and
  determine the location score based, at least in part, on the locations associated with network activity by other members of the cohort.

7. A computer system comprising:
one or more computer readable storage devices configured to store one or more software modules including computer executable instructions; and
one or more hardware computer processors in communication with the one or more computer readable storage devices and configured to execute the computer executable instructions in order to cause the computer system to:
  receive information associated with a plurality of accesses of a network by a user, wherein the information includes, for each of the accesses of the network, at least:
    an identity, provided by the user, associated with the access of the network;
    a respective hostname of a machine used by the user to access the network;
    a respective time associated with the access to the network; and
    respective location information associated with the access to the network by the user;
  determine respective host scores for each of the accesses of the network, wherein the host scores indicate respective likelihoods of malicious activity based, at least in part, on a number of unique machines used to access the network;
  determine respective speed scores for each of the accesses of the network, wherein the speed scores indicate respective likelihoods of malicious activity based, at least in part, on calculated travel speeds;
  determine respective location scores for each of the accesses of the network, wherein the locations scores indicate respective likelihoods of malicious activity based, at least in part, on attack origin distribution data;
  determine respective aggregate scores for each of the accesses of the network, wherein the respective aggregate scores are based, at least in part, on the respective host scores, speed scores, and location scores; and
  generate one or more user interfaces including:
    a list of users including the user;
    respective anomaly scores associated with users of the list of users, wherein the respective anomaly scores are based, at least in part, on the aggregate scores associated with each respective user of the list of users.

8. The computer system of claim 7, wherein the one or more user interfaces further include the list of users in an ordered list according to at least one of anomaly scores of the users, host scores of the users, speed scores of the users, location scores of the users, or aggregate scores of the users.

9. The computer system of claim 7, wherein the one or more hardware computer processors are further configured to execute the computer executable instructions in order to cause the computer system to:
generate a warning when at least one of the anomaly scores associated with the list of users, host scores of the users, speed scores of the users, location scores of the users, or aggregate scores of the users exceeds a threshold.

10. The computer system of claim 7, wherein:
the location information comprises an internet protocol (IP) address; and
the one or more hardware computer processors are further configured to execute the computer executable instructions in order to cause the computer system to:
perform an IP lookup to determine geographical coordinates associated with the IP address; and
calculate the travel speed for the user to arrive at the geographical coordinates.

11. The computer system of claim 7, wherein:
the location information comprises an internet protocol (IP) address; and
the one or more hardware computer processors are further configured to execute the computer executable instructions in order to cause the computer system to:
perform an IP lookup to determine a country associated with the IP address; and
determine the location score by multiplying a probability that the country is the source of an attack times a probability of an attack on the network and dividing by the probability of activity coming from the country.

12. The computer system of claim 7, wherein:
the host score indicates increasingly higher likelihoods of malicious activity for each additional unique machine used by the user to access the network until a threshold number of unique machines are logged;
the host score indicates a highest likelihood of malicious activity when the threshold number of unique machines is logged;
the host score indicates a likelihood of malicious activity that is lower than the highest likelihood of malicious activity when more than the threshold number of unique machines is logged; and
the host score indicates a low likelihood of malicious activity when the machine used by the user to access the network has been previously used by the user to access the network.

13. The computer system of claim 7, wherein the one or more hardware computer processors are further configured to execute the computer executable instructions in order to cause the computer system to perform a mathematical convolution based, at least in part, on the respective aggregate scores for each of the accesses of the network to determine a convoluted score, and wherein an anomaly score for the user is based, at least in part, on the convoluted score.

14. The computer system of claim 7, wherein the one or more hardware computer processors are further configured to execute the computer executable instructions in order to cause the computer system to:
sort the user into a cohort;
determine the host score based, at least in part, on network activity of other members of the cohort; and
determine the location score based, at least in part, on the network activity of other members of the cohort.

15. A computer system comprising:
one or more computer readable storage devices configured to store computer executable instructions; and
one or more hardware computer processors in communication with the one or more computer readable storage devices and configured to execute the computer executable instructions in order to cause the computer system to:
receive information associated with an access to the network by a user via a computer, the information comprising an identity provided by the user and an identification of the computer, wherein the user has not previously accessed the network via the computer;
determine a first host score based, at least in part, on the identification of the user and an identification of the computer, wherein the first host score indicates a likelihood that the access to the network was malicious;
after receiving the information, receiving second information associated with a later access to the network by the user via a new computer, the second information comprising the identity provided by the user and an identification of the new computer, wherein the user has not previous accessed the network via the new computer;
determine a second host score based, at least in part, on the user accessing the network via the new computer, wherein the second host score indicates a lower likelihood that the access to the network was malicious compared to the first host score.

16. The computer system of claim 15, wherein the one or more hardware computer processors are further configured to execute the computer executable instructions in order to cause the computer system to:
receive, as part of the information, a first internet protocol (IP) address associated with the access to the network;
determine a first location associated with the first IP address;
receive third information associated with a third access to the network by the user, the third information comprising the identification of the user, a different IP address, and a different time associated with the third access;
determine a different location associated with the different IP address; and
calculate a speed score based at least in part on a speed of travel from the first location at the first time to the different location at the different time, wherein the speed score indicates a likelihood that the third access to the network was malicious.

17. The computer system of claim 15, wherein the one or more hardware computer processors are further configured to execute the computer executable instructions in order to cause the computer system to:
receive, as part of the information, a first internet protocol (IP) address and a first time associated with the access to the network;
calculate, based on attack origin distribution data, a probability that the network access from the first location is malicious by multiplying a probability that the first location is the source of an attack times a probability of an attack on the network and dividing by the probability of activity coming from the first location, wherein the first location is a country; and determine a location score based, at least in part, on the probability, wherein the location score indicates a likelihood that the access to the network was malicious.

18. The computer system of claim 15, wherein the one or more hardware computer processors are further configured to execute the computer executable instructions in order to cause the computer system to:

receive, as part of the second information, an IP address and a time associated with the later access to the network;

determine a location score for the later access to the network, the location score being indicative of a likelihood that the later access to the network was malicious based, at least in part, on attack origin distribution data;

determine a speed score for the for the later access to the network, the speed score being indicative of a likelihood that the later access to the network was malicious based, at least in part, on a calculated travel speed for the user; and determine an aggregate score for the later access to the network, wherein the aggregate score is based, at least in part, on the second host score, the location score, and the speed score.

19. The computer system of claim 18, wherein the one or more hardware computer processors are further configured to execute the computer executable instructions in order to cause the computer system to:

determine an aggregate score for the access to the network;

perform a mathematical convolution of a plurality of aggregate scores comprising the aggregate score for the later access to the network.

20. The computer system of claim 15, wherein the one or more hardware computer processors are further configured to execute the computer executable instructions in order to cause the computer system to:

sort the user into a cohort;

determine the first host score based, at least in part, on the behavior of other members of the cohort; and determine the second host score based, at least in part, on the behavior of other members of the cohort.

* * * * *

UNITED STATES PATENT AND TRADEMARK OFFICE
CERTIFICATE OF CORRECTION

PATENT NO. : 9,628,500 B1
APPLICATION NO. : 15/224443
DATED : April 18, 2017
INVENTOR(S) : Kesin et al.

Page 1 of 1

It is certified that error appears in the above-identified patent and that said Letters Patent is hereby corrected as shown below:

In Column 7 at Line 57, Change "013b" to --103b--.

In Column 21 at Line 19 (approx.), Change "$S+W_2R_2+ \ldots +W_NR_N$" to --$S=W_1R_1+W_2R_2+ \ldots +W_NR_N$--.

In Column 24 at Line 16, After "storage" insert --.--.

In Column 37 at Line 19, In Claim 18, change "for the for the" to --for the--.

Signed and Sealed this
Seventeenth Day of April, 2018

Andrei Iancu
*Director of the United States Patent and Trademark Office*